United States Patent
Uno

(10) Patent No.: US 9,961,228 B2
(45) Date of Patent: May 1, 2018

(54) IMAGE PROCESSING APPARATUS AND CONTROL METHOD THEREOF

(71) Applicant: CANON KABUSHIKI KAISHA, Tokyo (JP)

(72) Inventor: Yukiko Uno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 14/920,114

(22) Filed: Oct. 22, 2015

(65) Prior Publication Data
US 2016/0119499 A1    Apr. 28, 2016

(30) Foreign Application Priority Data

Oct. 28, 2014    (JP) .................................. 2014-219714

(51) Int. Cl.
*H04N 5/232*    (2006.01)
*H04N 1/21*    (2006.01)

(52) U.S. Cl.
CPC ....... *H04N 1/2125* (2013.01); *H04N 5/23212* (2013.01); *H04N 5/23293* (2013.01)

(58) Field of Classification Search
CPC ............. H04N 1/2125; H04N 5/23212; H04N 5/23293
See application file for complete search history.

(56) References Cited

U.S. PATENT DOCUMENTS

2011/0273471 A1*  11/2011  Nagasaka ..........  H04N 5/23212
                                                  345/619
2013/0216199 A1*   8/2013  Nakajima ..........  H04N 5/23212
                                                  386/224

FOREIGN PATENT DOCUMENTS

JP    2003-101910 A    4/2003

OTHER PUBLICATIONS

JP 2003-101910 Translation.*

* cited by examiner

*Primary Examiner* — Angel L Garces-Rivera
(74) *Attorney, Agent, or Firm* — Cowan, Liebowitz & Latman, P.C.

(57) ABSTRACT

Provided is an image processing apparatus and control method thereof that enable image data from which a plurality of images can be generated to be browsed efficiently. In the case where a first image switching operation has been made through an input unit, a display is switched to display an image generated from a different image file from an image file used to generate an image currently being displayed, and in the case where a second image switching operation has been made through the input unit, the display is switched to display a different image generated from an image file used to generate the image being displayed.

17 Claims, 20 Drawing Sheets

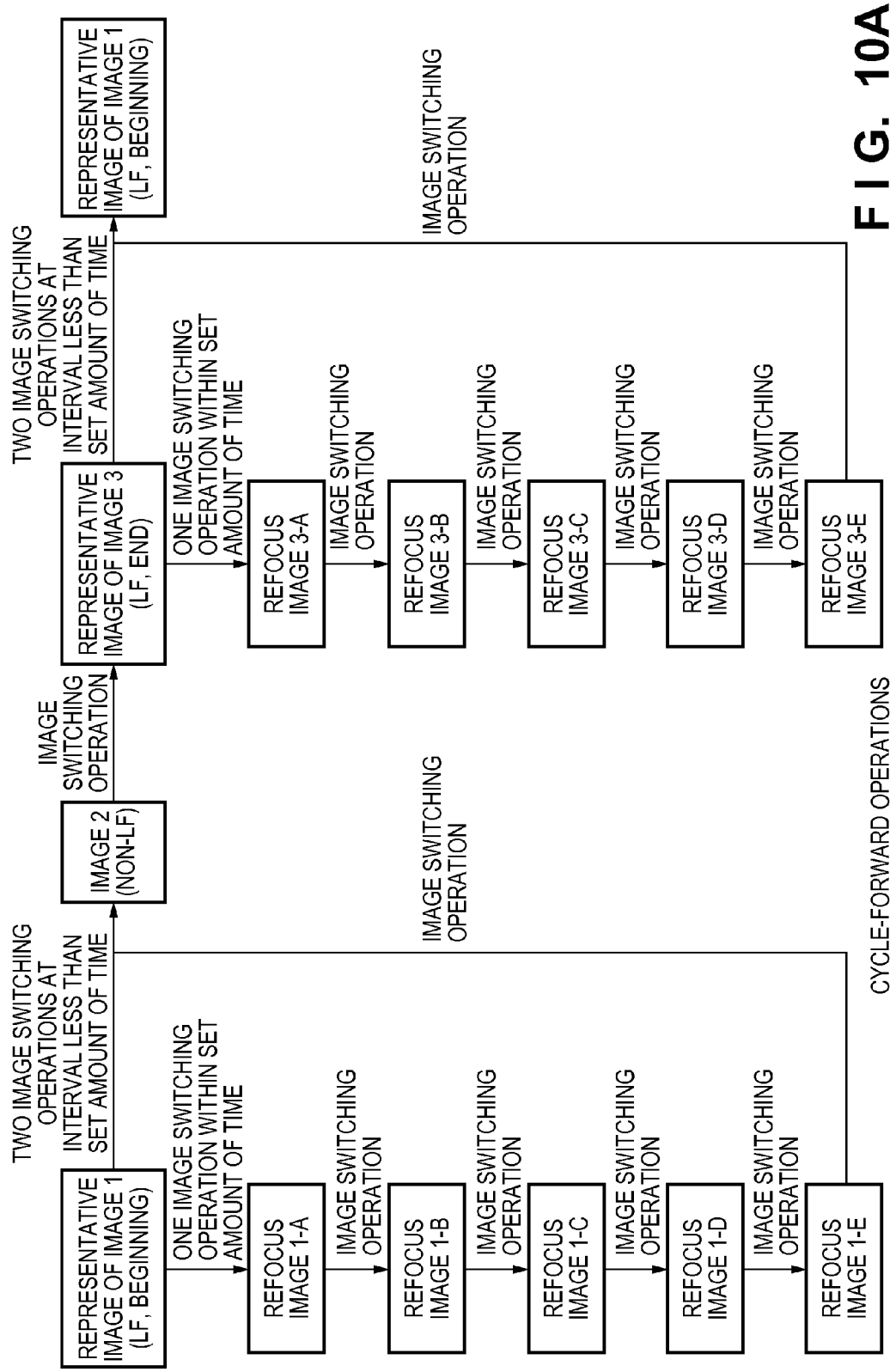
F I G. 10A

IMAGE PROCESSING APPARATUS AND CONTROL METHOD THEREOF

BACKGROUND OF THE INVENTION

Field of the Invention

The present invention relates to image processing apparatuses and control methods thereof, and particularly relates to an image display technique.

Description of the Related Art

When browsing images saved in a memory card, a hard disk drive, or the like, it is difficult to display a desired image efficiently when there are many images present. Accordingly, methods have been proposed in which multiple images are displayed simultaneously, images are displayed while skipping a certain number of images, and so on in response to a user operation. Meanwhile, Japanese Patent Laid-Open No. 2003-101910 discloses a playback method in which when a plurality of related images obtained through continuous shooting, bracket shooting, or the like are interspersed with normally-shot images, a user can switch between a method of switching images among the related images and a method of switching the image to the next normally-shot image.

Recently, image capture apparatuses called light field cameras that are capable of obtaining light field data (light ray spatial information) are garnering attention. The image sensor of a light field camera is provided with a microlens array, and a plurality of pixels are assigned to each microlens. Accordingly, a signal representing the intensity of light incident from a specific direction (light field data) can be obtained from each of the plurality of pixels assigned to a single microlens. Carrying out a process for focusing this light field data on a virtual imaging plane makes it possible to reconstruct an image focused on a subject at a different distance than the subject that was in focus at the time of shooting (a refocus image).

Here, in the case where image data to be displayed is image data from which a plurality of images can be generated, such as light field data, a situation where one wishes to switch the image data and a situation where one wishes to switch the image to be generated without switching the image data are conceivable.

However, the method disclosed in Japanese Patent Laid-Open No. 2003-101910 switches the playback method based on whether images are a plurality of images related to each other at the time of shooting or independent images, and thus image data from which a plurality of images can be generated will be handled as independent images.

SUMMARY OF THE INVENTION

Having been achieved in light of such problems with past techniques, the present invention provides an image processing apparatus and control method thereof that enable image data from which a plurality of images can be generated to be browsed efficiently.

According to an aspect of the present invention, there is provided an image processing apparatus comprising: an input unit through which a first image switching operation and a second image switching operation can be made; and a control unit configured to switch a displayed image in accordance with an image switching operation made through the input unit, wherein the control unit: switches an image being displayed to an image generated from a different image file from an image file used to generate the image being displayed in a case where the first image switching operation has been made through the input unit; and switches the image currently being displayed to a different image generated from the image file used to generate the image being displayed in a case where the second image switching operation has been made through the input unit.

According to another aspect of the present invention, there is provided a control method of an image processing apparatus having an input unit through which a first image switching operation and a second image switching operation can be made, the method comprising: switching an image being displayed to an image generated from a different image file from an image file used to generate the image being displayed in a case where the first image switching operation has been made through the input unit; and switching the image currently being displayed to a different image generated from the image file used to generate the image being displayed in a case where the second image switching operation has been made through the input unit.

According to a further aspect of the present invention, there is provided a non-transitory computer-readable storage medium in which is stored a program for causing a computer to function as at least a control unit of an image processing apparatus comprising: an input unit through which a first image switching operation and a second image switching operation can be made; and a control unit configured to switch a displayed image in accordance with an image switching operation made through the input unit, wherein the control unit: switches an image being displayed to an image generated from a different image file from an image file used to generate the image being displayed in a case where the first image switching operation has been made through the input unit; and switches the image currently being displayed to a different image generated from the image file used to generate the image being displayed in a case where the second image switching operation has been made through the input unit.

Further features of the present invention will become apparent from the following description of exemplary embodiments (with reference to the attached drawings).

BRIEF DESCRIPTION OF THE DRAWINGS

FIGS. 10A and 10B are schematic diagrams illustrating an example of image switching through the playback process operations according to the second embodiment.

DESCRIPTION OF THE EMBODIMENTS

Exemplary embodiments of the present invention will now be described in detail in accordance with the accompanying drawings. Although the following describes an embodiment in which the present invention is applied in a digital camera capable of obtaining light field data, it should be noted that such a digital camera is merely one example of an image processing apparatus in which the present invention can be applied. Image capturing and recording functions are not requisite items in the present invention, and the present invention can be carried out in any electronic device capable of processing image data in which a focus distance can be selected after shooting, such as light field data. A personal computer, a cellular telephone, a game console, a tablet terminal, a PDA, and so on are examples of such an electronic device, but the electronic device is not limited thereto.

First Embodiment

Figure 1A:
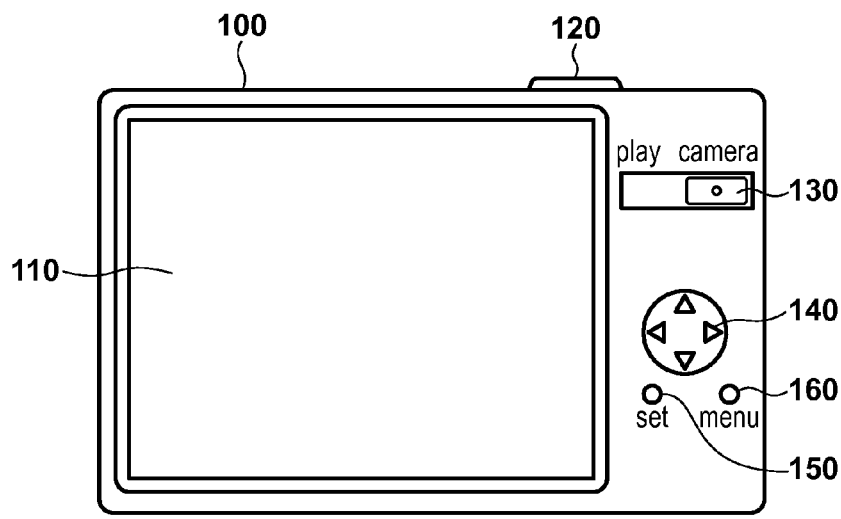
FIGS. 1A and 1B are diagrams illustrating an example of the configuration of a digital camera according to an embodiment of the present invention.

FIG. 1A schematically illustrates the external appearance of a rear surface side of a digital camera 100 according to the present embodiment. A display unit 110 is a touch display, for example, and is used to display images such as shot images and playback images, GUI screens and components, and so on. A shooting button 120 is used by a user to provide a instruction to prepare for shooting, a shooting start instruction, and so on to the digital camera 100. A mode change switch 130 is used to switch an operating mode of the digital camera 100 among a playback mode, a shooting mode, and power on/off. An operation button 140 is constituted of four directional keys, namely up, down, left, and right, and is used to manipulate menus and so on in the digital camera 100. A set button 150 is used to determine selected menu items and the like or notify the digital camera 100 of selections. A menu button 160 is used to call a menu screen.

The user can use the functions of the digital camera 100 by manipulating the touch panel in the display unit 110 and manipulating the operation button 140, the set button 150, and the menu button 160. In the playback mode, images can be switched by using the operation button 140. The mode change switch 130 can be set to the left to switch to the playback mode, to the right to switch to the shooting mode, and to the center to switch the power off.

Figure 1B:
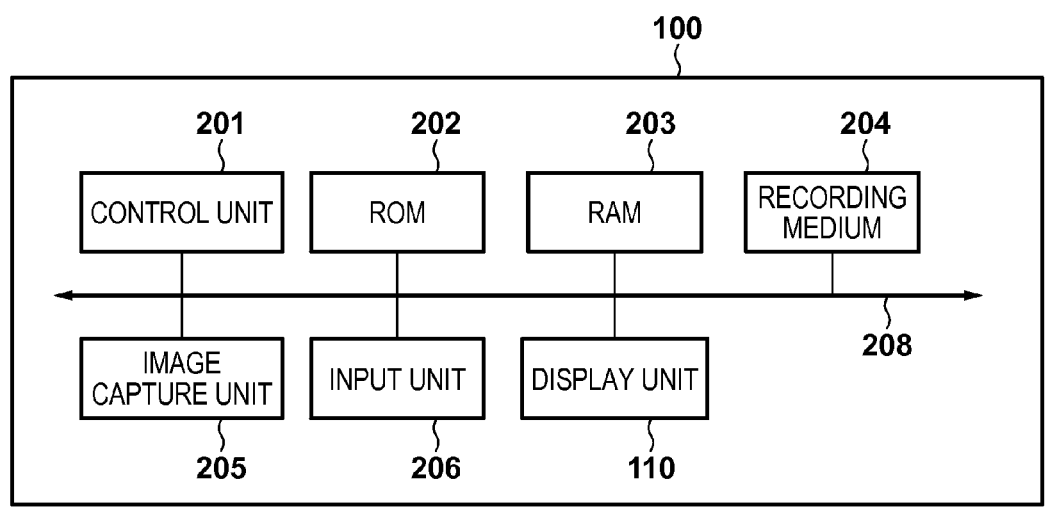

FIG. 1B is a block diagram illustrating an example of the functional configuration of the digital camera 100. A control unit 201 is, for example, a central processing unit (CPU) that controls the digital camera 100 as a whole. A rewritable read-only memory (ROM) 202 holds programs, parameters, and so on. In the present embodiment, control programs necessary for the control unit 201 to realize processes of the digital camera 100, including a playback process that will be described later, are recorded in the ROM 202. A random access memory (RAM) 203 temporarily stores programs, data, and the like. Although the present embodiment assumes that the control programs are recorded in the ROM 202, the control programs may be recorded in a recording medium 204, an external device capable of communicating with the digital camera 100, or the like.

The recording medium 204 is removable from the digital camera 100, and digital data such as image data is recorded therein as files. A semiconductor memory card, an optical or magnetic disk, a magnetic or optical card, and so on are examples of the recording medium 204, but the recording medium 204 is not limited thereto.

An image capture unit 205 is constituted of a lens, a shutter, an aperture, an image sensor, and so on, and converts incoming light into image data. As will be described later, the image capture unit 205 is configured to be capable of obtaining light field data.

An input unit 206 is a group of input devices such as switches, buttons, a touch panel, and so on that can be manipulated by the user. The shooting button 120, the mode change switch 130, the touch panel of the display unit 110, the operation button 140, the set button 150, and the menu button 160 illustrated in FIG. 1A are included in the input unit 206.

An internal bus 208 serves as a transmission path for control signals, data signals, and so on among the respective blocks in the digital camera 100.

Figure 2A:
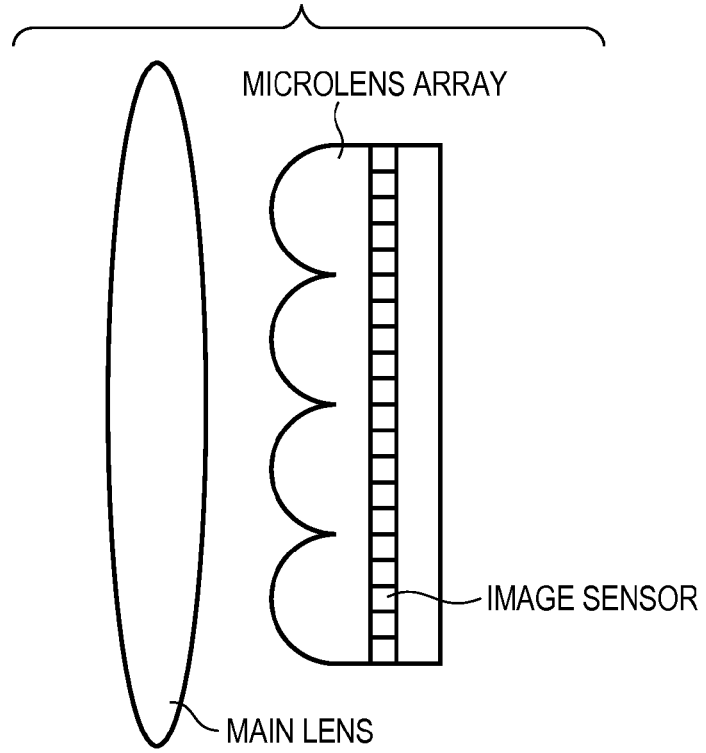
FIGS. 2A and 2B are diagrams illustrating an example of the configuration of an image capture unit provided in the digital camera according to the embodiment.
Figure 2B:
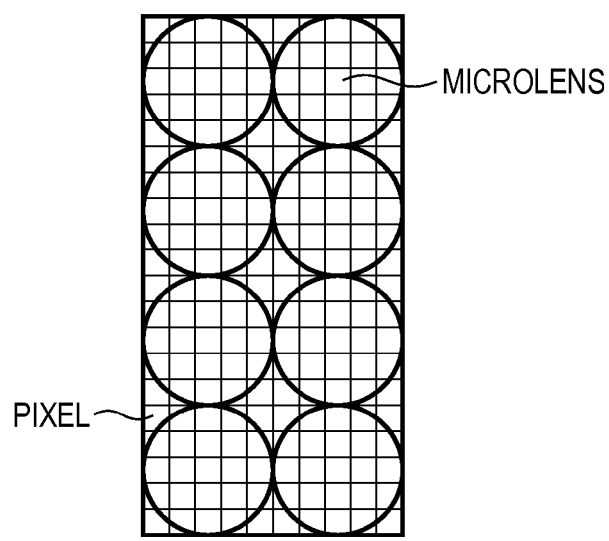

FIGS. 2A and 2B are diagrams schematically illustrating part of the configuration of the image capture unit 205, where FIG. 2A is a vertical cross-sectional view and FIG. 2B is a front view seen from a main lens side. Note that FIGS. 2A and 2B only illustrate part of a pixel array in the image sensor, and in reality, the same configuration extends throughout the image capture unit 205.

The main lens is schematically illustrated as an image forming lens, which has a plurality of lenses including a focus lens, as a single lens, and forms an optical image of a subject on an image forming surface of the image sensor. In the present embodiment, a shutter that doubles as an aperture is incorporated into the main lens as well.

In the image capture unit 205 of the present embodiment, a microlens array is disposed between the main lens and the image sensor, and the configuration is such that a plurality of pixels (5×5 pixels, in the present embodiment) correspond to each microlens of which the microlens array is constituted. As a result, image data obtained from the plurality of pixels corresponding to each microlens is image data captured from an exit pupil from different viewpoints, and thus signals corresponding to light beams incident from specific angles are obtained from the respective pixels. In other words, light field data can be obtained from a single shot. Note that the number of microlenses and the number of pixels per microlens can be set as desired. In addition, a normal captured image that is not light field data can also be obtained by adding the signals of the pixels corresponding to a single microlens.

Note that the light field data may be generated using another desired method. The aforementioned configuration for generating the light field data is not a requirement for the present invention; all that is necessary is that generated light field data can be obtained. In addition, a known technique can be used for a refocusing process for reconstructing a refocus image focused at a specific distance from the light field data, and thus detailed descriptions thereof will be omitted.

The operating modes of the digital camera 100 include the shooting mode that records image data in the recording medium 204 and the playback mode that plays back the image data recorded in the recording medium 204. Operations carried out when the playback mode is set using the mode change switch 130 (playback process operations) will be described hereinafter. Here, it is assumed that image data including light field data is saved in the recording medium 204.

Figure 6:
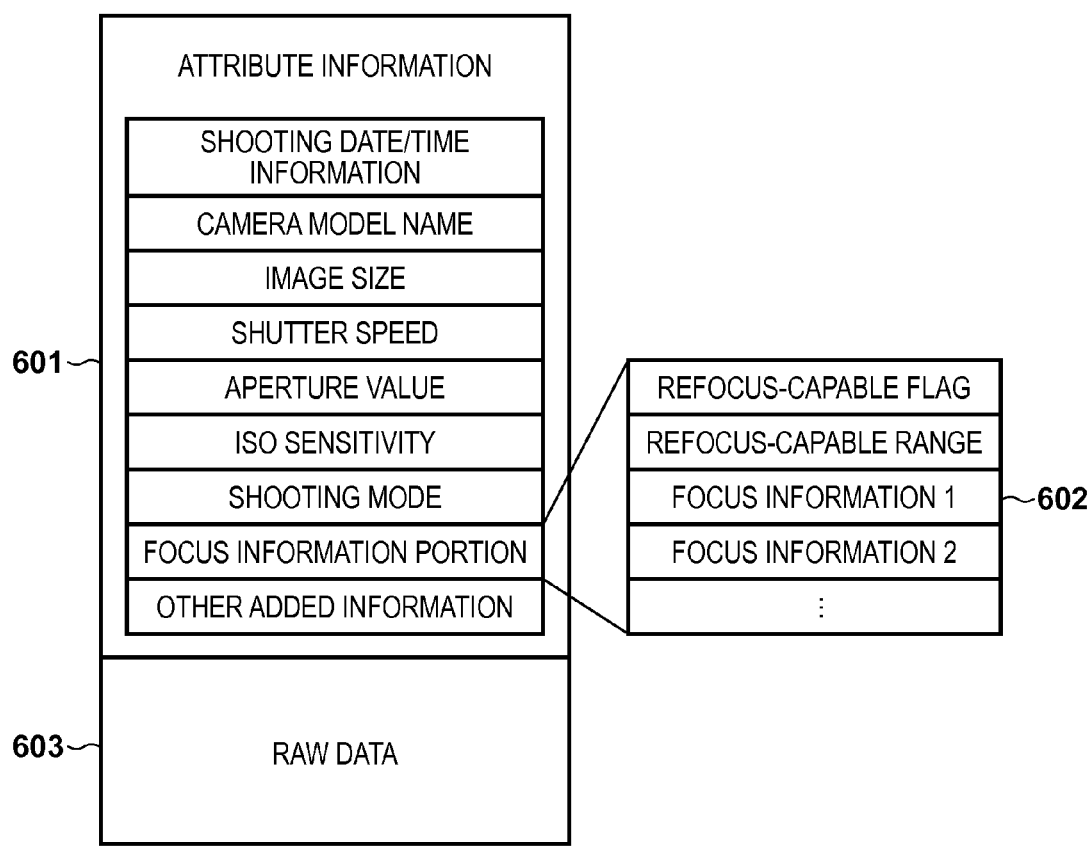
FIG. 6 is a diagram illustrating an example of the structure of an image file according to the first embodiment.

In the present embodiment, it is assumed that the image data is recorded in the recording medium 204 in an image file format in which attribute information is added to a header portion, as illustrated in FIG. 6. Specifically, the attribute information recorded in a header portion 601 is shooting date/time information, a camera model name, an image size, a shutter speed, an aperture value, an ISO sensitivity, a shooting mode, a focus information portion, and other added information.

Of the attribute information, a focus information portion 602 includes a refocus-capable flag, a refocus-capable range, and one or more pieces of focus information, and the multiple pieces of focus information may be associated with a single piece of RAW data. The refocus-capable flag indicates whether the image data held in an image data portion 603 is light field data or is normally-captured image data, and in the present embodiment, is a 1-bit flag having a value of 1 in the case of light field data and 0 in the case of normally-captured image data.

The refocus-capable range is a maximum value and minimum value for a focus distance at which a refocus image can be synthesized from the light field data, and is determined by, for example, an aperture value at the time of shooting, a focal length of an image forming optical system, the number of pixels per microlens, and so on. A distance from a lens surface of the image capture unit 205 to a position to be focused on (that is, the focus distance), determined at the time of shooting, for example, is recorded as the focus information. Alternatively, other information may be recorded as the focus information. For example, a depth map or a range image obtained through a known method may be recorded in another region of the header portion 601, and only coordinates in the image data to be focused on may then be recorded as the focus information. In this case, the focus distance can be obtained by using the focus information to reference the depth map. RAW data obtained through shooting is held in the image data portion 603.

Operations in the playback process of the digital camera 100 will be described using the flowcharts illustrated in FIGS. 3, 4A, and 4B.

In S400, the control unit 201 obtains an image file from the recording medium 204. The image file obtained at this time may be, of the image files recorded in the recording medium 204, the image file having the oldest or newest shooting date/time, an image file of the image data displayed when the previous playback process ended, or the like.

In S401, the control unit 201 analyzes the header information of the obtained image file.

In S402, the control unit 201 determines whether or not the obtained image file is a light field data file based on the refocus-capable flag in the header information analyzed in S401. In the case where the refocus-capable flag is 1, the control unit 201 determines that the image file is light field data, and the process moves to S403, whereas in the case where the refocus-capable flag is 0, the control unit 201 determines that the image file is normally-captured image data, and the process moves to S405.

In S403, the control unit 201 analyzes the focus information in the header information analyzed in S401, and obtains a focus distance list by carrying out a focus distance selection process, which will be described later. The focus distance list is a list in which focus distances for synthesizing respective refocus images displayed in a refocus image switching process, which will be described later, are sorted in ascending order or descending order. Classification information indicating whether the focus distance is a default focus distance or a focus distance added by the digital camera 100 is added to each focus distance. The control unit 201 saves the focus distance list in the RAM 203 or the recording medium 204 in association with the image file.

In S404, the control unit 201 generates a representative image using the light field data obtained from the image data portion 603 of the image file, and displays the representative image in the display unit 110. While the representative image is not particularly limited, in the present embodiment, the control unit 201 generates a pan-focus image as the representative image and displays that image in the display unit 110. Note that the method for generating the pan-focus image from the light field data is not particularly limited. In addition, the pan-focus image may have pan-focus within a range made possible using the refocus image, and the entire image need not necessarily be in focus.

In S405, the control unit 201 displays the obtained image in the display unit 110.

In S406, the control unit 201 finds whether or not the input unit 206 has been operated; the process moves to S407 in the case where there has been an operation, and moves to S406 in the case where there has been no operation.

In S407, the control unit 201 determines whether the image currently being displayed is an image based on light field data and whether the operation of the input unit 206 is an image switching operation 2, which will be described later. In the case where the control unit 201 has determined that both conditions have been met, the process moves to S410, whereas in the case where both conditions have not been met, the process moves to S408. Note that in the present embodiment, the image switching operation 2 is assumed to be the up or down key of the operation button 140 being depressed.

In S408, the control unit 201 determines whether the operation of the input unit 206 is an image switching operation 1 or 2, the process moves to S411 in the case where the operation is determined to be the image switching operation 1 or 2, and moves to S409 when such is not the case. Note that in the present embodiment, the image switching operation 1 is assumed to be the right or left key of the operation button 140 being depressed. Note also that in S408, the image switching operation 2 may be ignored and the process may move to S411 only in the case where the operation has been determined to be the image switching operation 1.

In S409, the control unit 201 determines whether the operation of the input unit 206 is a playback end operation; in the case where the operation is determined to be a playback end operation, the control unit 201 ends the playback process, and when such is not the case, returns the process to S406. The playback end operation is the user turning the power off or an operation for switching to the shooting mode, for example.

In S410, the control unit 201 carries out the refocus image switching process. In the refocus image switching process, the control unit 201 displays a refocus image synthesized based on the focus distance list in the display unit 110. Details will be given later. Note that a representative image and a refocus image generated from the same light field data are images representing the same scene.

In S411, the control unit 201 carries out the image file switching process. In the image file switching process, the control unit 201 obtains an image file from the recording medium 204 that is different from the image currently displayed in the display unit 110. Details will be given later.

Next, the refocus image switching process carried out in S410 of FIG. 3 will be described using the flowchart in FIG. 4A.

In S421, the control unit 201 determines whether the image switching operation 2 is a cycle-forward operation (an operation of the up key); the process moves to S422 in the case of a cycle-forward operation, and moves to S425 in the case of a cycle-backward operation (an operation of the down key).

In S422, the control unit 201 refers to the focus distance list and determines whether or not the image currently displayed in the display unit 110 is a representative image or a refocus image generated using the focus distance at the end of the focus distance list. In the case where it has been determined that the image being displayed is a representative image or a refocus image corresponding to the focus distance at the end of the focus distance list, the control unit 201 moves the process to S423, and moves the process to S424 when such is not the case.

In S423, the control unit 201 obtains the focus distance at the beginning of the focus distance list and advances the process to S428.

In S424, the control unit 201 refers to the focus distance list, obtains the focus distance listed in the focus distance list after (in the direction toward the end) the focus distance obtained immediately previous thereto, and advances the process to S428.

On the other hand, in S425, the control unit 201 refers to the focus distance list and determines whether or not the image currently displayed in the display unit 110 is a representative image or a refocus image generated using the focus distance at the beginning of the focus distance list. In the case where it has been determined that the image being displayed is a representative image or a refocus image corresponding to the focus distance at the beginning of the focus distance list, the control unit 201 moves the process to S426, and moves the process to S427 when such is not the case.

In S426, the control unit 201 obtains the focus distance at the end of the focus distance list and advances the process to S428.

In S427, the control unit 201 refers to the focus distance list, obtains the focus distance listed in the focus distance list before (in the direction toward the beginning) the focus distance obtained immediately previous thereto, and advances the process to S428.

In S428, the control unit 201 generates data of a refocus image focused at a distance equivalent to the obtained focus distance from the lens surface of the image capture unit 205, displays the refocus image in the display unit 110, and ends the refocus image switching process.

Note that the configuration may be such that in the case where it has been determined in S422 that a refocus image corresponding to the focus distance at the end of the focus distance list is being displayed, S423 and S428 are skipped and the refocus image switching process ends. In this case, while the refocus image corresponding to the focus distance at the end of the focus distance list is being displayed, the display will not change even if the image switching operation 2 (cycle-forward) for advancing the focus distance is carried out. Likewise, the configuration may be such that in the case where it has been determined in S425 that a refocus image corresponding to the focus distance at the beginning of the focus distance list is being displayed, S426 and S428 are skipped and the refocus image switching process ends. In this case, while the refocus image corresponding to the focus distance at the beginning of the focus distance list is being displayed, the display will not change even if the image switching operation 2 (cycle-backward) for returning the focus distance is carried out.

Next, the image file switching process of S411 will be described using the flowchart in FIG. 4B. In the present embodiment, in the case where an image switching operation has been carried out through a cycle-forward operation (the right key or the up key of the operation button 140), the image file having the next-newest shooting date/time is selected in the display unit 110, and the image file having the oldest shooting date/time is selected after the image file having the newest shooting date/time. Meanwhile, in the case where the image switching operation 1 has been carried out through a cycle-backward operation (the left key or the down key of the operation button 140), the image file is selected so as to move backward through the shooting dates/times, and the newest image file is selected after the oldest image file.

In S431, the control unit 201 determines whether the image switching operation 1 is a cycle-forward operation (an operation of the right key); the process moves to S432 in the case of a cycle-forward operation, and moves to S435 in the case of a cycle-backward operation (an operation of the left key).

In S432, the control unit 201 determines whether or not the image currently displayed in the display unit 110 is an image generated from the image file saved at the end by shooting date order (that is, the oldest image file) in the recording medium 204. In the case where the image generated from the image file at the end is being displayed, the control unit 201 moves the process to S433, and in the case where an image generated from another image file is being displayed, moves the process to S434.

In S433, the control unit 201 obtains the image file saved at the beginning in shooting date order (that is, the newest image file) from the recording medium 204 and ends the image file switching process.

In S434, the control unit 201 obtains the image file saved next in shooting date order from the recording medium 204 and ends the image file switching process.

In S435, the control unit 201 determines whether or not the image currently displayed in the display unit 110 is an image generated from the image file saved at the beginning by shooting date order (that is, the newest image file) in the recording medium 204. In the case where the image generated from the image file at the beginning is being displayed, the control unit 201 moves the process to S436, and in the case where an image generated from another image file is being displayed, moves the process to S437.

In S436, the control unit 201 obtains the image file saved at the end in shooting date order (that is, the oldest image file) from the recording medium 204 and ends the image file switching process.

In S437, the control unit 201 obtains the image file saved one previous in shooting date order from the recording medium 204 and ends the image file switching process.

Note that the configuration may be such that in the case where it is determined in S432 that an image generated from the image file at the end is being displayed, S433 is skipped and the image file switching process is ended. In this case, while the image generated from the image file at the end is displayed, the display does not change even if the image switching operation 1 (cycle-forward) for advancing in the image file order is carried out. Likewise, the configuration may be such that in the case where it is determined in S435 that an image generated from the image file at the beginning is being displayed, S436 is skipped and the image file switching process is ended. In this case, while the image generated from the image file at the beginning is displayed, the display does not change even if the image switching operation 1 (cycle-backward) for returning in the image file order is carried out.

Figure 5:
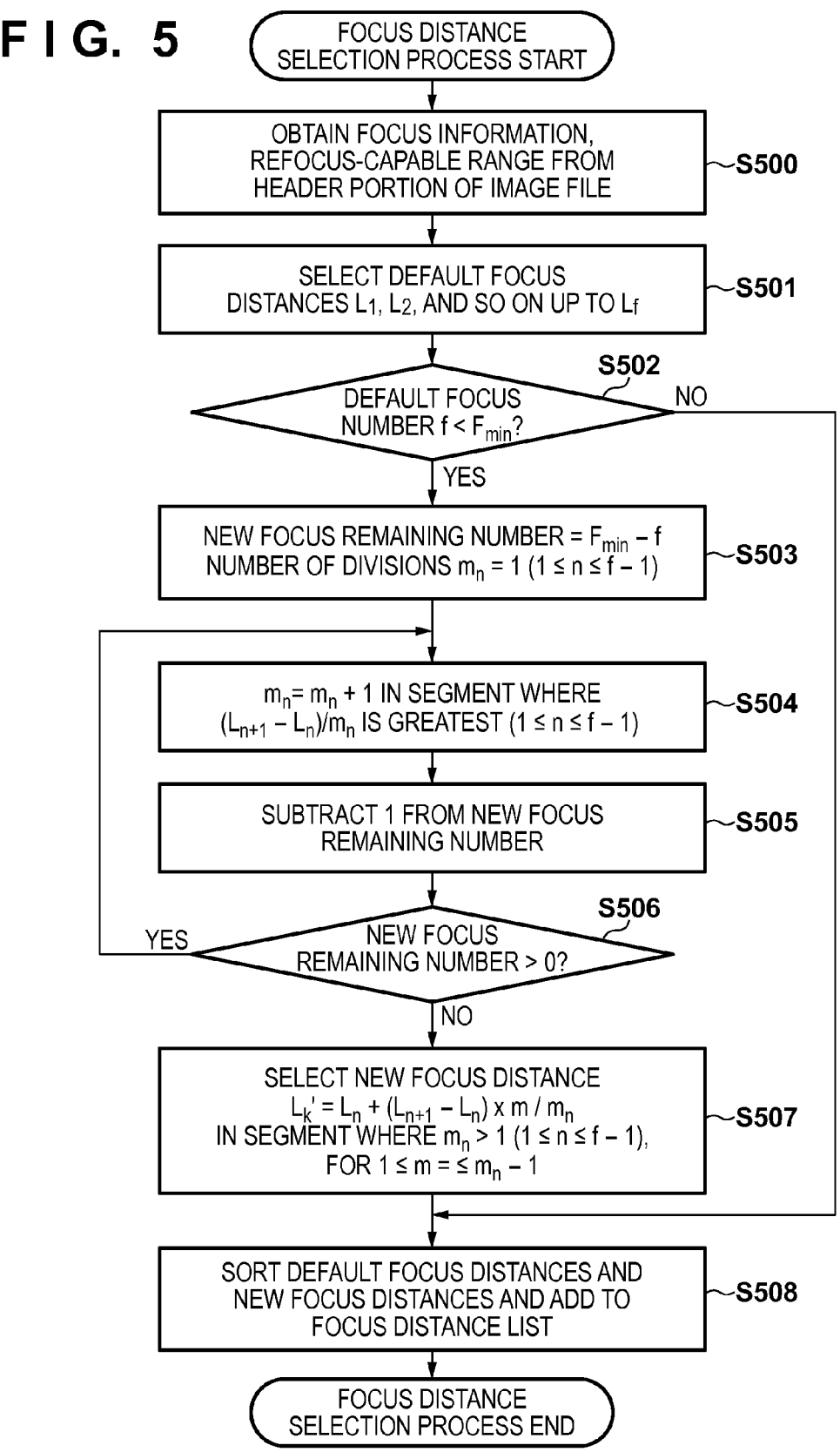
FIG. 5 is a flowchart illustrating operations of a focus distance selection process according to the first embodiment.

Next, the focus distance selection process carried out in S403 of FIG. 3 will be described using the flowchart in FIG. 5.

In this process, in the case where the number of pieces of focus information contained in the header portion 601 of the image file is lower than a minimum focus number, focus information indicating focus distances distributed at equal intervals to the greatest extent possible within the refocus-capable range is newly selected and added to the focus distance list. Note that the minimum focus number is a minimum number of images that can be displayed in refocus image switching, and will be represented by $F_{min}$ hereinafter. $F_{min}$ is assumed to be set in the digital camera 100 in advance.

In S500, the control unit 201 obtains the focus information and the refocus-capable range that are set from the focus information portion 602 of the header portion 601 in the obtained image file.

In S501, the control unit 201 obtains the focus distances indicated by all of the focus information obtained in S500 and the focus distances indicating the refocus-capable range (the maximum value and the minimum value), and sorts these in ascending order. These are collectively called "default focus distances", and are represented by $L_1$, $L_2$, and so on up to $L_f$. In the case where there is not even a single piece of focus information in the focus information portion 602, the default focus distances are only the maximum value and the minimum value set as the refocus-capable range, and thus the total number f of the default focus distances is 2.

In S502, the control unit 201 determines whether or not the total number f of the default focus distances is less than $F_{min}$. In the case where f is less than $F_{min}$, the control unit 201 moves the process to S503, whereas in the case where f is greater than or equal to $F_{min}$, the control unit 201 moves the process to S508.

In S503, the control unit 201 sets a remaining number of focus distances that need to be newly selected to $F_{min}$-f. This will be called a "new focus remaining number". Meanwhile, an initial value for a number of divisions $m_n$ ($1 \leq n \leq f-1$) is set to 1 for (f-1) sets of adjacent default focus distances $L_{n+1}$ and $L_n$. The number of divisions $m_n$ indicates into how many equal segments $L_{n+1}-L_n$ is to be divided in a process that will be described later.

In S504, the control unit 201 adds 1 to $m_n$ where ($L_{n+1}-L_n$)/$m_n$ is greatest within the range of $1 \leq n \leq f-1$.

In S505, the control unit 201 reduces the new focus remaining number by 1.

In S506, in the case where the new focus remaining number is greater than 0, the control unit 201 returns the process to S504, whereas when such is not the case, the control unit 201 moves the process to S507.

In S507, the control unit 201 obtains $m_n$ new focus distances arranged at equal intervals between adjacent default focus distances. Specifically, $L_k'=L_n+(L_{n+1}-L_n) \times i/m_n$ (where $1 \leq i \leq m_n-1$ and $1 \leq \leq F_{min}-f$) is obtained as a new focus distance for $1 \leq n \leq f-1$ only in the case where $m_n>1$.

In S508, the control unit 201 sorts the default focus distances obtained in S501 and the new focus distances $L_k'$ obtained in S507, saves these in the focus distance list along with classification information, and ends the process. The classification information is information indicating whether the focus distance is a new focus distance or a default focus distance.

By arranging the focus distances in this manner, the refocus image can be displayed while varying the focus distance within the refocus-capable range as close to constant intervals as possible.

Figure 7A:
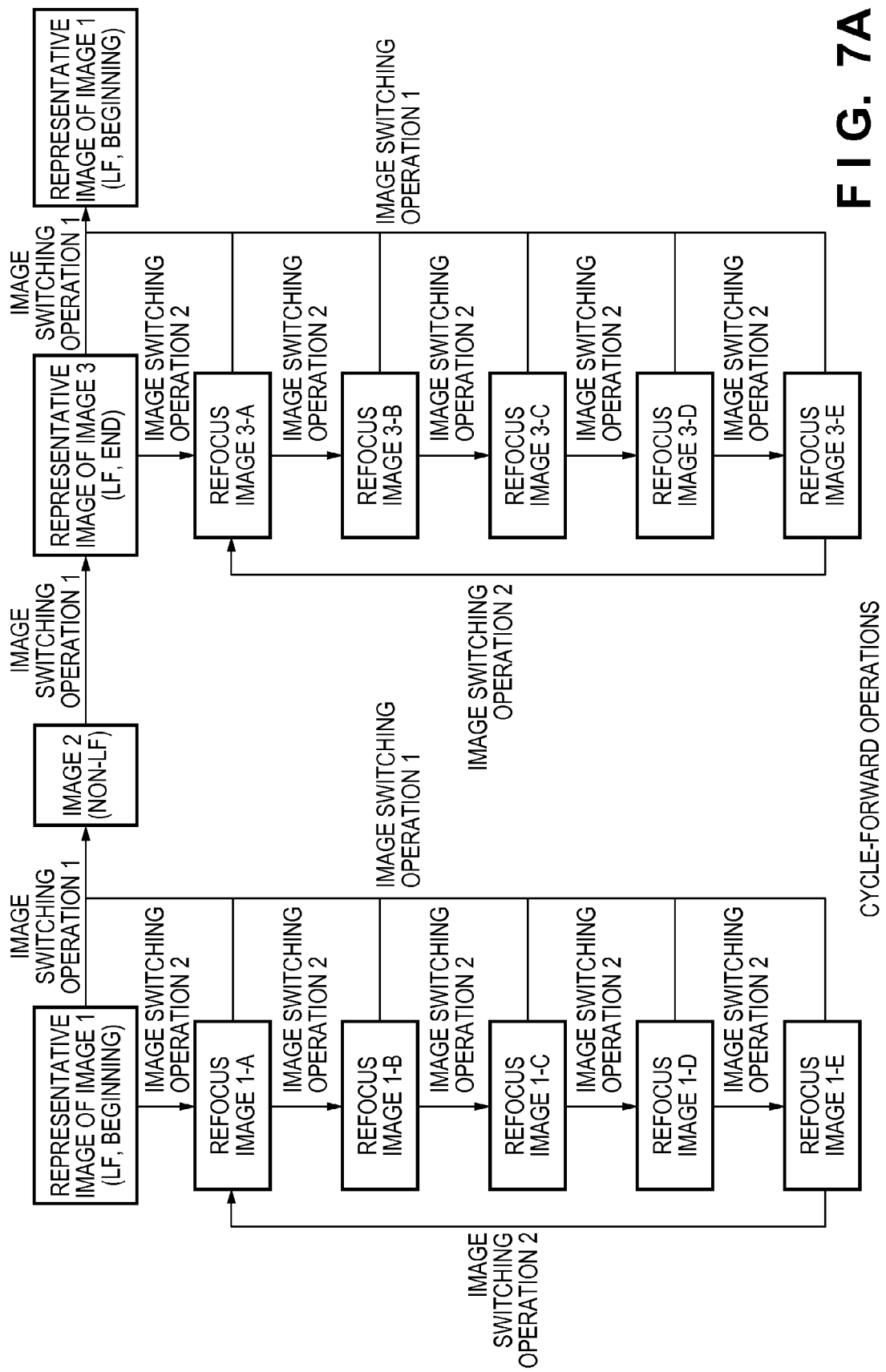
FIGS. 7A and 7B are schematic diagrams illustrating an example of image switching through the playback process operations according to the first embodiment.

FIG. 7A illustrates transitions of images displayed in the display unit 110 in the case where the image switching operation 1 using the right key of the operation button 140 (cycle-forward) and the image switching operation 2 using the up key (cycle-forward) are carried out in the present embodiment.

Figure 7B:
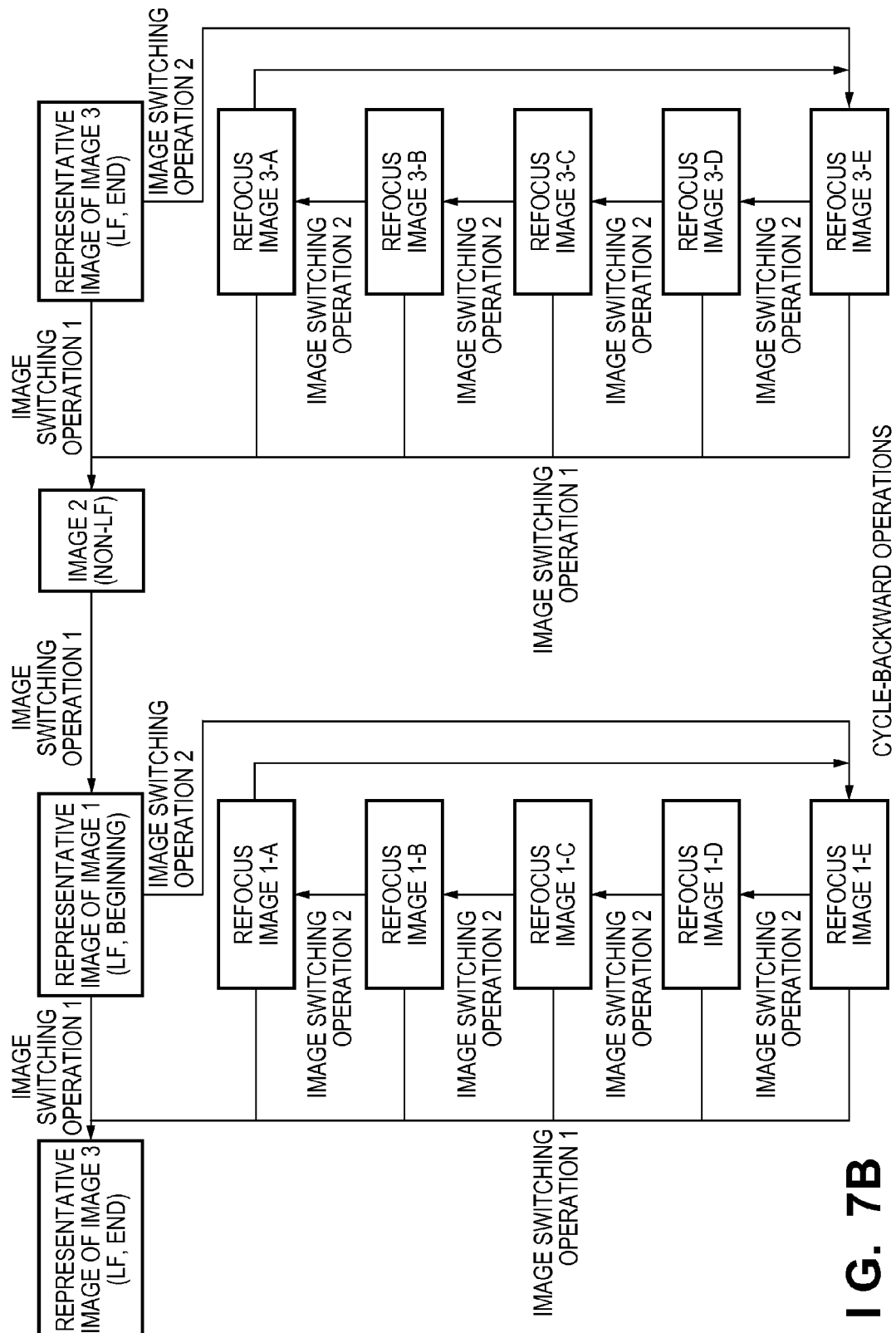

Meanwhile, FIG. 7B illustrates transitions of images displayed in the display unit 110 in the case where the image switching operation 1 using the left key of the operation button 140 (cycle-backward) and the image switching operation 2 using the down key (cycle-backward) are carried out.

It is assumed here that an image file 1 to an image file 3 are recorded in the recording medium 204 in shooting date/time order. Meanwhile, it is assumed that the image data of the image file 1 and the image file 3 is light field data (LF), whereas the image data of the image file 2 is normally-captured image data (non-LF). Furthermore, it is assumed that the minimum focus number is 5, and that refocus images 1-A to 1-E correspond to the focus distance at the beginning of the focus distance list (closest) to the focus distance at the end (farthest).

As described thus far, according to the present embodiment, the user can switch the displayed image among image files or among pieces of image data by making an operation in a first direction (for example, a horizontal direction). In addition, the user can switch the displayed image among refocus images having different focus distances generated from the same light field data, by making an operation in a second direction orthogonal to the first direction (for example, a vertical direction).

Note that a display indicating that an image being displayed is a refocus image (including a representative image) may be carried out. This makes it easy for the user to understand that refocus image switching is possible.

According to the present embodiment, a focus distance is additionally set in the case where the number of focus distances set in the light field data is less than a predetermined number. Accordingly, for light field data, the user can easily confirm refocus images at a variety of focus distances, including focus distances not set at the time of recording. In addition, the number of refocus images that can be switched can be controlled regardless of the number of pieces of focus information set in the obtained light field data.

Second Embodiment

The first embodiment describes an example in which the image switching operations 1 and 2 are assigned to the left and right keys and up and down keys of the operation button 140. In the present embodiment, however, the image switching operations 1 and 2 are realized using only the left and right keys of the operation button 140.

Aside from operations in the playback process, the digital camera 100 according to the present embodiment is the same as that according to the first embodiment, and thus details described in the first embodiment, such as functional configurations, the image file configuration, and so on, will be omitted here.

Figure 8A:
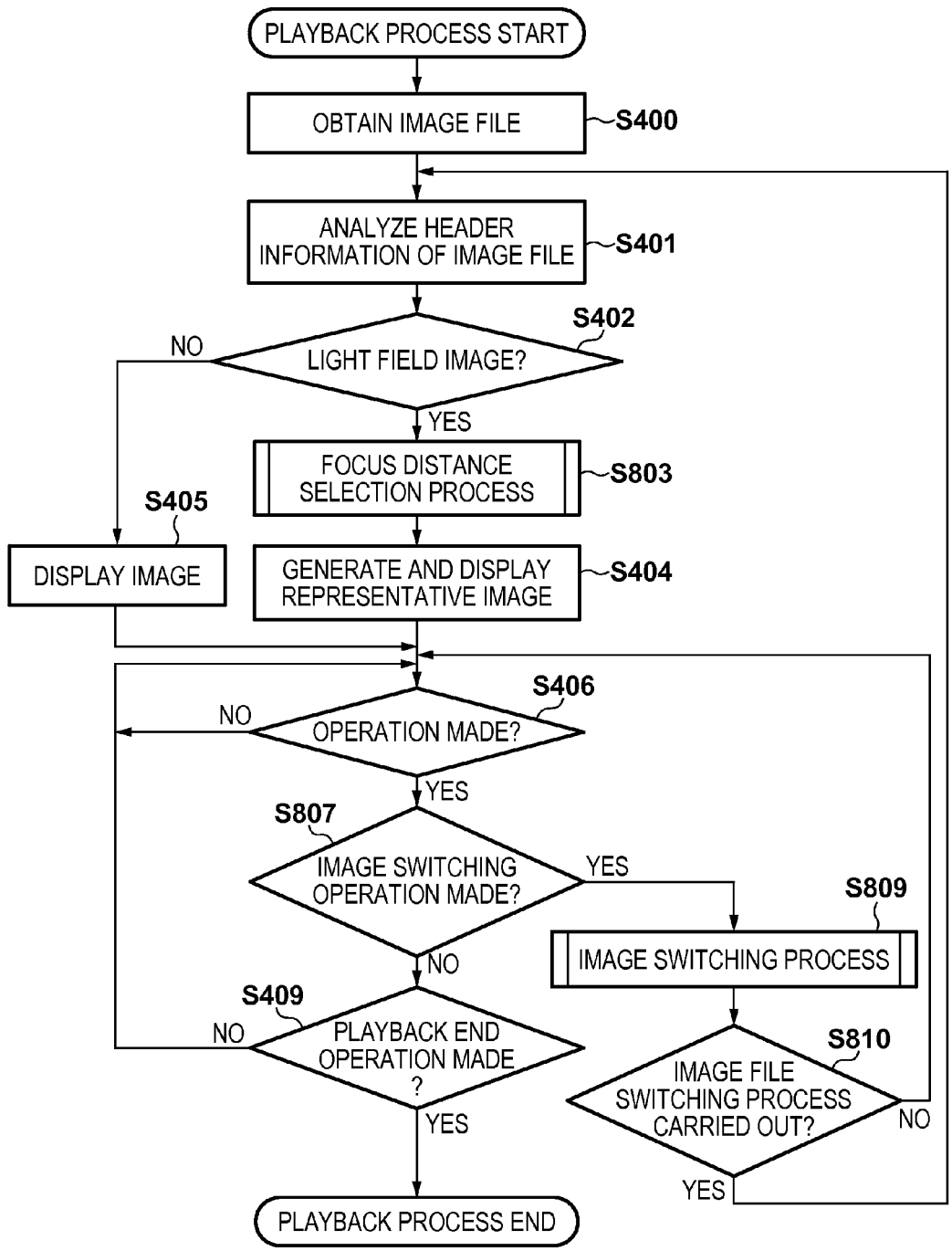
FIG. 8A is a flowchart illustrating operations of a playback process according to a second embodiment.
Figure 8B:
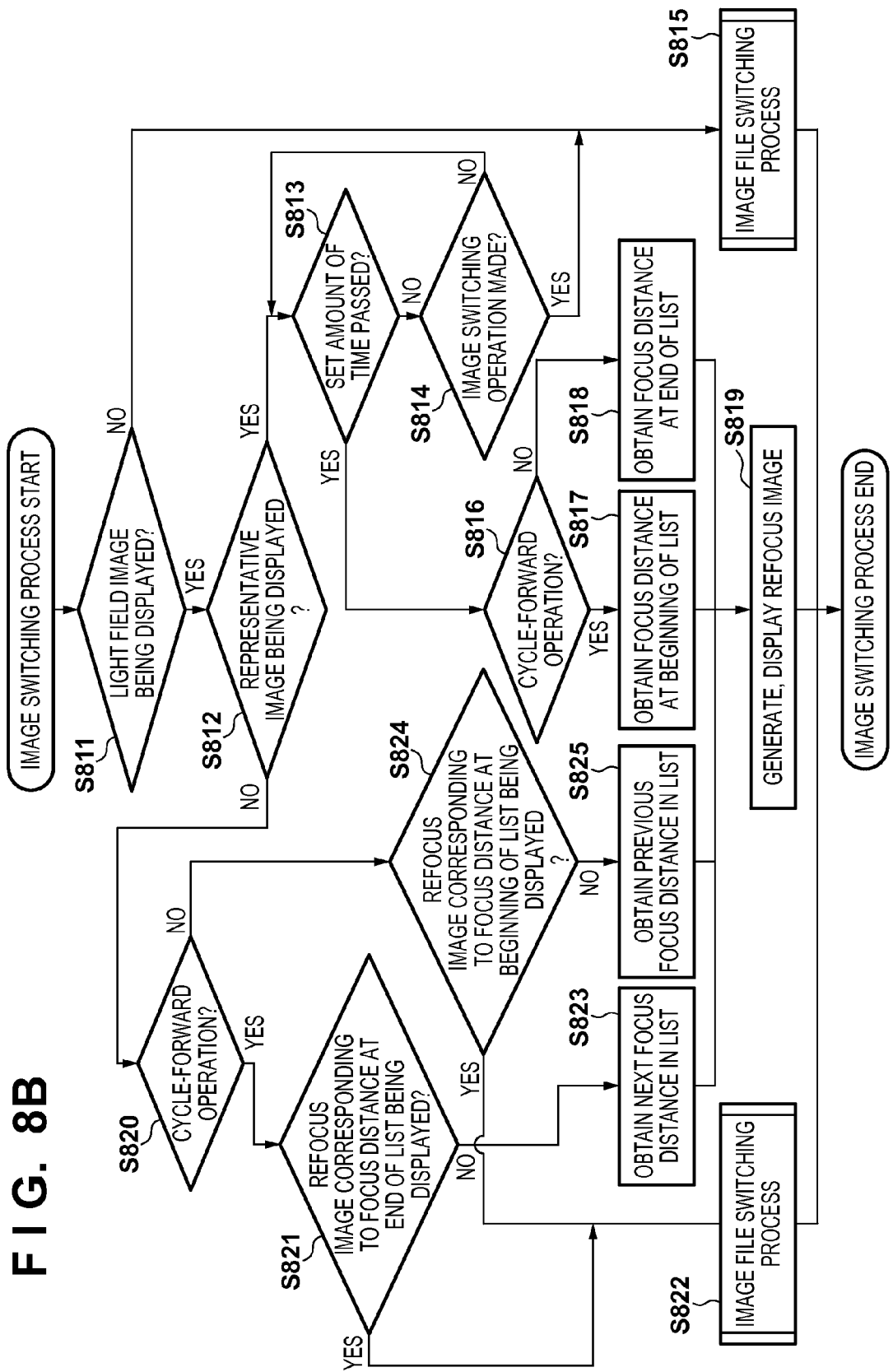
FIG. 8B is a flowchart illustrating operations of an image switching process according to the second embodiment.
Figure 9:
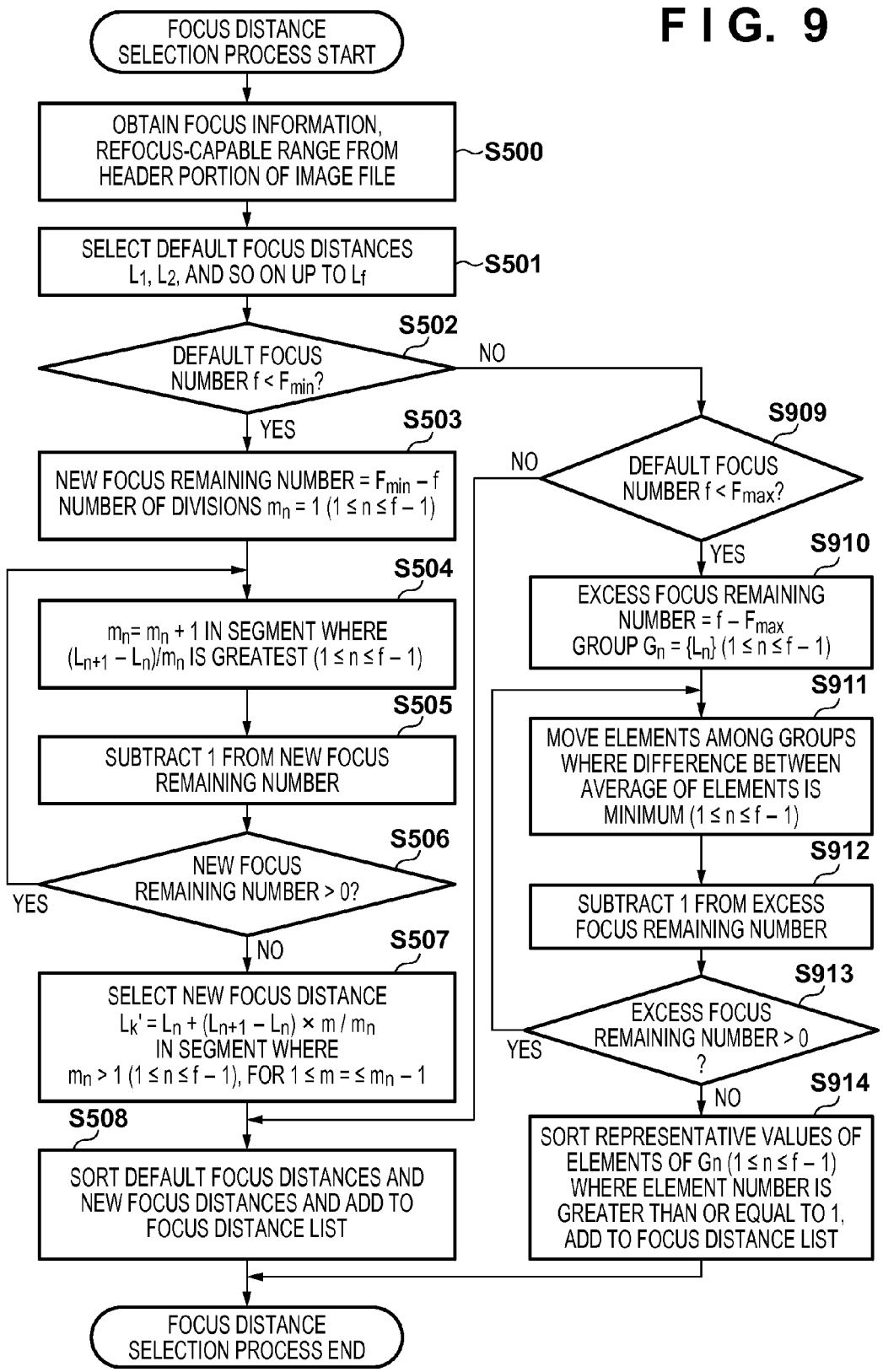
FIG. 9 is a flowchart illustrating operations of a focus distance selection process according to the second embodiment.

Next, operations in the playback process carried out by the digital camera 100 according to the present embodiment will be described using the flowcharts in FIGS. 8A, 8B, and 9. In FIG. 8A, steps that carry out processes identical to those in the first embodiment have been given the same reference numerals as in FIG. 3, and descriptions thereof will be omitted.

A focus distance selection process carried out in S803 will be described later using FIG. 9.

In S807, the control unit 201 determines whether the operation of the input unit 206 is an image switching operation, and the process moves to S809 in the case where the operation is determined to be an image switching operation, and moves to S409 when such is not the case. Note that in the present embodiment, the image switching operation is assumed to be the right or left key of the operation button 140 being depressed.

In S809, the control unit 201 carries out the image switching process. In the image switching process, the control unit 201 obtains a different image file or switches the image being displayed to a different refocus image of the same image file in accordance with a type of the image being displayed in the display unit 110 and the type or input interval of the image switching operation. Details will be given later.

In S810, the control unit 201 moves the process to S401 in the case where a different image file from the image currently being displayed has been obtained in S809, and moves the process to S406 when such is not the case.

Next, the image switching process of S809 will be described using the flowchart in FIG. 8B. In the present embodiment, a process for switching the image file is carried out in the case where a cycle-forward operation is carried out during the display of a refocus image corresponding to the focus distance at the end of the list and in the case where a cycle-backward operation is carried out during the display of a refocus image corresponding to the focus distance at the beginning of the list. In addition, a process for switching the image file is carried out in the case where an image switching operation is carried out multiple times within a set amount of time during the display of the representative image of the light field data. Other image switching operations are the same as in the first embodiment. Descriptions will be given in order hereinafter.

In S811, the control unit 201 moves the process to S812 in the case where the image currently displayed in the display unit 110 is an image generated from light field data, and moves the process to S815 in the case where the image is a normal image.

In S812, the control unit 201 moves the process to S813 in the case where the image currently displayed in the display unit 110 is a representative image of the light field data, and moves the process to S820 when such is not the case.

In S813, the control unit 201 determines whether a predetermined set amount of time has passed since the image switching operation was detected in S807; the process moves to S814 in the case where that amount of time has not passed, and moves to S816 in the case where that amount of time has passed.

In S814, the control unit 201 determines whether or not a further image switching operation has been carried out; the process moves to S815 in the case where it has been determined that an image switching operation has been carried out, and moves to S813 in the case where it has been determined that an image switching operation has not been carried out. In this manner, by combining S813 and S814, the control unit 201 determines whether or not a further image switching operation has been carried out within a set amount of time following the image switching operation detected in S807. Here, the set amount of time is an amount of time used to determine that the user has intentionally made two image switching operations in a row, and is therefore set to a short amount of time, such as 0.5 seconds, for example. In this manner, in the present embodiment, image switching operations made while the representative image of the light field data is being displayed and in an interval less than the set amount of time are determined to be image file switching operations (the image switching operation 1).

Figure 3:
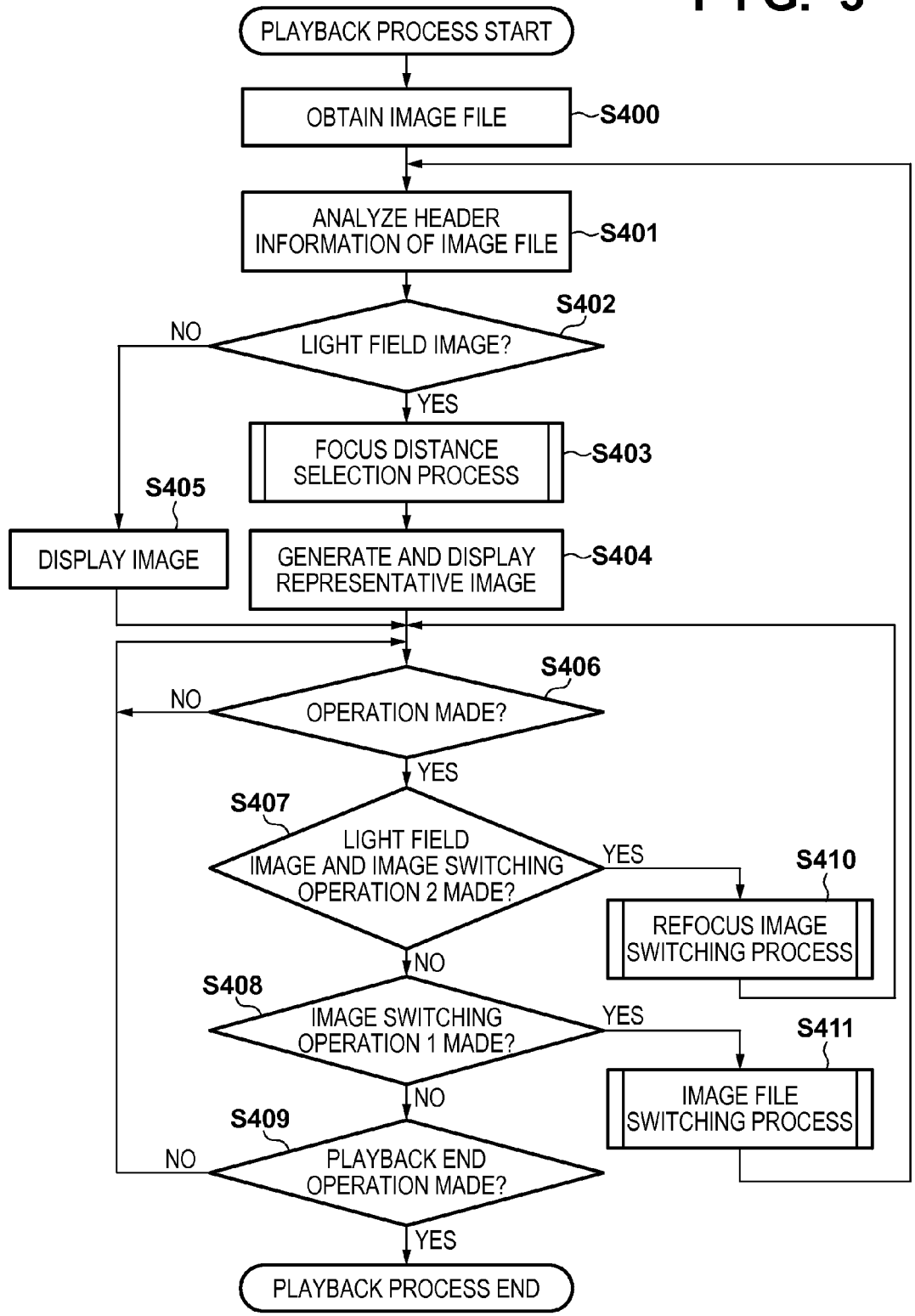
FIG. 3 is a flowchart illustrating operations of a playback process according to a first embodiment.

The image file switching process carried out in S815 is the same as the process carried out in S411 of FIG. 3, and therefore descriptions thereof will be omitted.

On the other hand, in the case where it is determined in S813 that the set amount of time has passed, in S816, the control unit 201 determines whether or not the image switching operation detected in S807 is a cycle-forward operation; the process moves to S817 in the case of a cycle-forward operation, and moves to S818 in the case of a cycle-backward operation. Here, the right key being depressed is assumed to be a cycle-forward operation, and the left key being depressed is assumed to be a cycle-backward operation, for example.

In S817, the control unit 201 obtains the focus distance at the beginning of the focus distance list and advances the process to S819.

In S818, the control unit 201 obtains the focus distance at the end of the focus distance list and advances the process to S819.

In the case where the image being displayed is not a representative image of the light field data in S812, in S820, the control unit 201 determines whether or not the image switching operation detected in S807 is a cycle-forward operation; the process moves to S821 in the case of a cycle-forward operation, and moves to S824 in the case of a cycle-backward operation.

In S821, the control unit 201 refers to the focus distance list and determines whether or not the image currently displayed in the display unit 110 is a refocus image generated using the focus distance at the end of the focus distance list. In the case where it has been determined that the image being displayed is a refocus image corresponding to the focus distance at the end of the focus distance list, the control unit 201 moves the process to S822, and moves the process to S823 when such is not the case.

In S823, the control unit 201 refers to the focus distance list, obtains the focus distance listed in the focus distance list after (in the direction toward the end) the focus distance obtained immediately previous thereto, and advances the process to S819.

On the other hand, in S824, the control unit 201 refers to the focus distance list and determines whether or not the image currently displayed in the display unit 110 is a refocus image generated using the focus distance at the beginning of the focus distance list. In the case where it has been determined that the image being displayed is a refocus image corresponding to the focus distance at the beginning of the focus distance list, the control unit 201 moves the process to S822, and moves the process to S825 when such is not the case.

In this manner, the control unit 201 also determines a cycle-forward operation during the display of the refocus image corresponding to the focus distance at the end of the list and a cycle-backward operation during the display of the refocus image corresponding to the focus distance at the beginning of the list to be image file switching operations (the image switching operation 1). The image file switching process carried out in S822 may be the same as the process carried out in S411 of FIG. 3, and therefore descriptions thereof will be omitted.

In S825, the control unit 201 refers to the focus distance list, obtains the focus distance listed in the focus distance list before (in the direction toward the beginning) the focus distance obtained immediately previous thereto, and advances the process to S819.

In S819, the control unit 201 generates data of a refocus image focused at a distance equivalent to the obtained focus distance from the lens surface of the image capture unit 205, displays the refocus image in the display unit 110, and ends the image switching process.

Next, the focus distance selection process carried out in S803 of FIG. 8A will be described using the flowchart in FIG. 9. Of the focus distance selection process according to the present embodiment, steps that carry out the same operations as those in the first embodiment have been given the same reference numerals as those in FIG. 5, and descriptions thereof will be omitted. As can be seen by comparing FIGS. 5 and 9, in the present embodiment, the process carried out in the case where the default focus number f is greater than or equal to the minimum focus number $F_{min}$ is different from that in the first embodiment.

Specifically, in the case where the default focus number f is greater than a maximum focus number $F_{max}$ corresponding to the maximum number of images that can be displayed when switching refocus images, the focus information is consolidated so that the default focus number f is less than or equal to the maximum focus number. Note that the maximum focus number $F_{max}$ is assumed to be set in the digital camera 100 in advance. The maximum focus number $F_{max}$ may be equal to the minimum focus number $F_{min}$. Note that in the case where the default focus number f, the maximum focus number $F_{max}$, and the minimum focus number $F_{min}$ are equal, a refocus image can be generated using only the default focus distances.

In the case where it has been determined in S502 that the default focus number f is greater than or equal to the minimum focus number $F_{min}$, the control unit 201 moves the process to S909.

In S909, the control unit 201 determines whether or not the total number f of the default focus distances is greater than $F_{max}$. In the case where f is greater than $F_{max}$, the control unit 201 moves the process to S910, whereas in the case where f is less than or equal to $F_{max}$, the control unit 201 moves the process to S508.

In S910, the control unit 201 sets a remaining number of focus distances that need to be deleted to $F_{max}-f$. This will be called an "excess focus remaining number". In addition, each default focus distance $L_n$ (where $1 \le n \le f$) is held in f focus distance groups $G_n$ (where $1 \le n \le f$) having each of the stated distances as initial element values.

In S911, for $1 \le n \le f-1$, the control unit 201 moves the elements of $G_{n+1}$, which is an adjacent group to $G_n$, to $G_n$ at a point when a difference between the average values of the elements in the groups $G_{n+1}$ and $G_n$ is the smallest, and deletes the elements of $G_{n+1}$. Note that in an initial state, there is one element in each group, and thus evaluation is carried out based on differences between the elements. In addition, when evaluating the differences between average values, the closest groups having elements are assumed to be adjacent groups.

In S912, the control unit 201 reduces the excess focus remaining number by 1.

In S913, in the case where the excess focus remaining number is greater than 0, the control unit 201 returns the process to S911, whereas when such is not the case, the control unit 201 moves the process to S914.

In S914, the control unit 201 finds a representative value for each $G_n$ (where $1 \le n \le f-1$) having one or more elements. For example, if there is one element, that element can be used as the representative value; if there are three or more elements, the element closest to the average value thereof can be used as the representative value, and if there are two elements, the element closest to the average value of two adjacent representative values can be used as the representative value. The control unit 201 then sorts and saves the representative values in the focus distance list and ends the process.

By arranging the focus distances in this manner, a refocus image focused at a distance near the focus information set in the light field data can be displayed while varying the focus distance within the refocus-capable range as close to constant intervals as possible. In addition, a set number of refocus images can be presented for each piece of light field data regardless of the number of pieces of focus information set in the light field data.

Figure 10B:
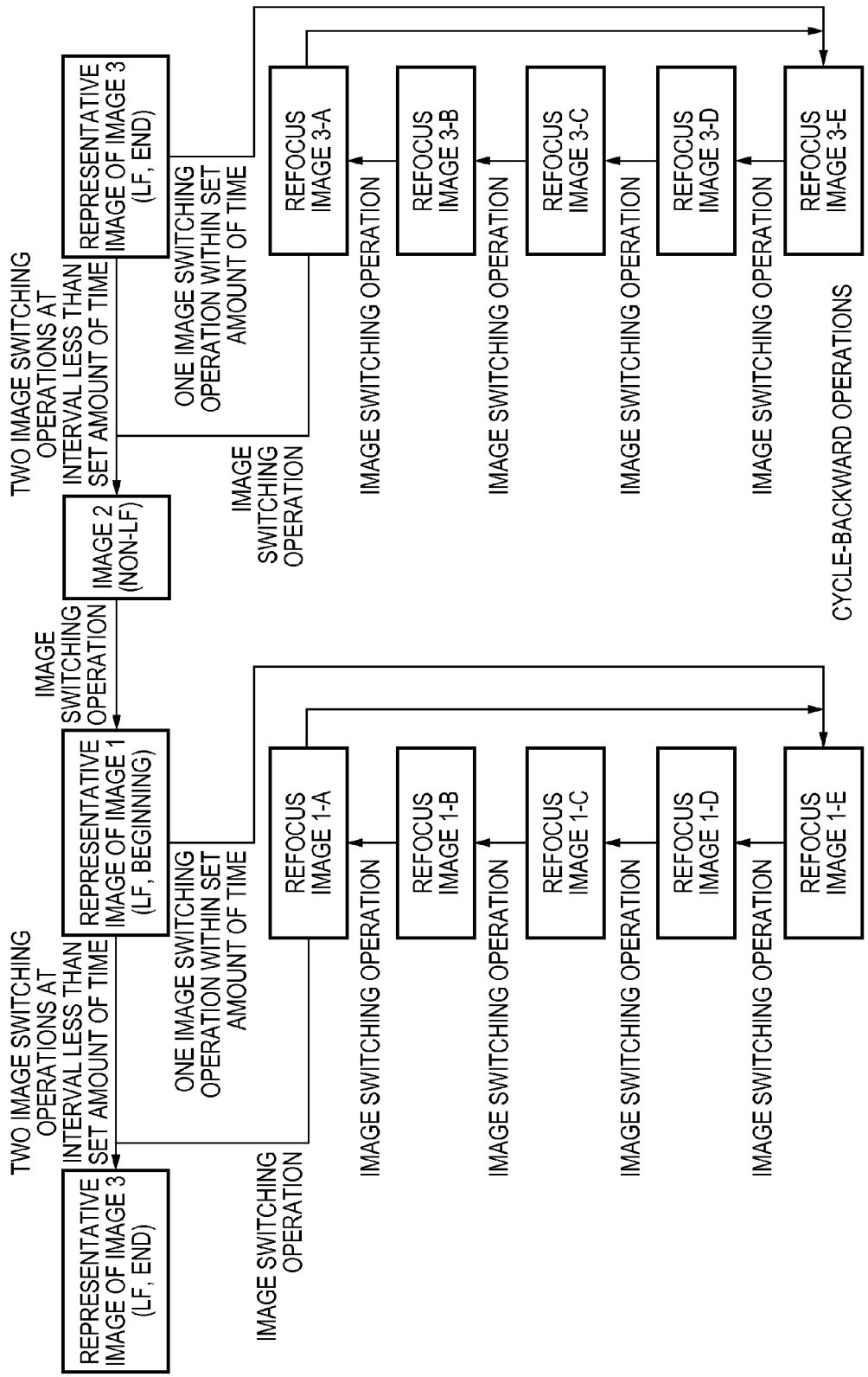

FIGS. 10A and 10B illustrate transitions of displayed images realized through the image switching process according to the present embodiment under conditions in which the same image file as in the first embodiment is recorded into the recording medium 204. FIG. 10A illustrates transitions of displayed images resulting from a cycle-forward image switching operation (the right key of the operation button 140 being manipulated), whereas FIG. 10B illustrates transitions of displayed images resulting from a cycle-backward image switching operation (the left key of the operation button 140 being manipulated).

As described thus far, according to the present embodiment, switches among image files and switches among refocus images having different focus distances generated from the same light field data can be realized through the same operational input method, specifically by varying an input interval.

Note that a display indicating that an image being displayed is a representative image of the light field data may be carried out. Through this, the user can easily understand that it is possible to switch among image files by repeating the image switching operation within the set amount of time. Meanwhile, descriptions have been given of a case in which two image switching operations carried out within the set amount of time are recognized as the image file switching operation only during the display of the representative image of the light field data. However, the configuration may be such that such operations are recognized as an image file switching operation during the display of an image aside from the representative image, such as a refocus image or a normal image, as well.

Furthermore, a display indicating that an image being displayed is a refocus image (aside from a representative image) may be carried out. This makes it easy for the user to understand that refocus image switching is possible.

According to the present embodiment, a focus distance is additionally set in the case where the number of focus distances set in the light field data is less than a predetermined number. In addition, the setting of a focus distance is canceled in the case where the number of focus distances set in the light field data is greater than a predetermined number. Accordingly, for light field data, the user can easily confirm refocus images at a variety of focus distances, including focus distances not set at the time of recording.

In addition, in the case where more than a set number of pieces of focus information have been obtained, the focus information can be reduced by being consolidated. Accordingly, the number of refocus images that can be switched can be controlled regardless of the number of pieces of focus information set in the obtained light field data. Note that the process for reducing the focus information according to the present embodiment can also be carried out in the first embodiment.

Third Embodiment

Next, a third embodiment of the present invention will be described. The present embodiment adds, to the refocus image switching process according to the first embodiment, a switching function aimed at refocus images and representative images corresponding to the default focus distances among the focus distances included in the focus distance list. Like the first embodiment, the image switching operation 2 is assumed to use the up and down keys of the operation button 140, and the image switching operation 1 is assumed to use the left and right keys.

Aside from the refocus image switching process, the digital camera 100 according to the present embodiment is the same as that according to the first embodiment, and thus details described in the first embodiment, such as functional configurations, the image file configuration, and so on, will be omitted here.

Next, the refocus image switching process according to the present embodiment will be described using the flowchart in FIG. 11. In the present embodiment, a continuous operation for the image switching operation 2 (a key being held down, for example) is recognized as a default focus distance switching operation. Specifically, when a continuous cycle-forward (up key) operation is detected, the new focus distances in the focus distance list are skipped, and the next default focus distance is obtained. In a continuous cycle-backward operation, the same process is carried out from the end toward the beginning of the focus distance list. Although it is assumed here that a representative image is displayed between displays of refocus images corresponding to the default focus distance at the end of the focus distance list and the default focus distance at the beginning of the focus distance list, the display of the representative image may be skipped. According to the configuration of the present embodiment, the burden of the user making a setting in a menu or the like for whether or not to select a focus distance aside from the default focus distance can be eliminated, which improves the usability.

Figure 4A:
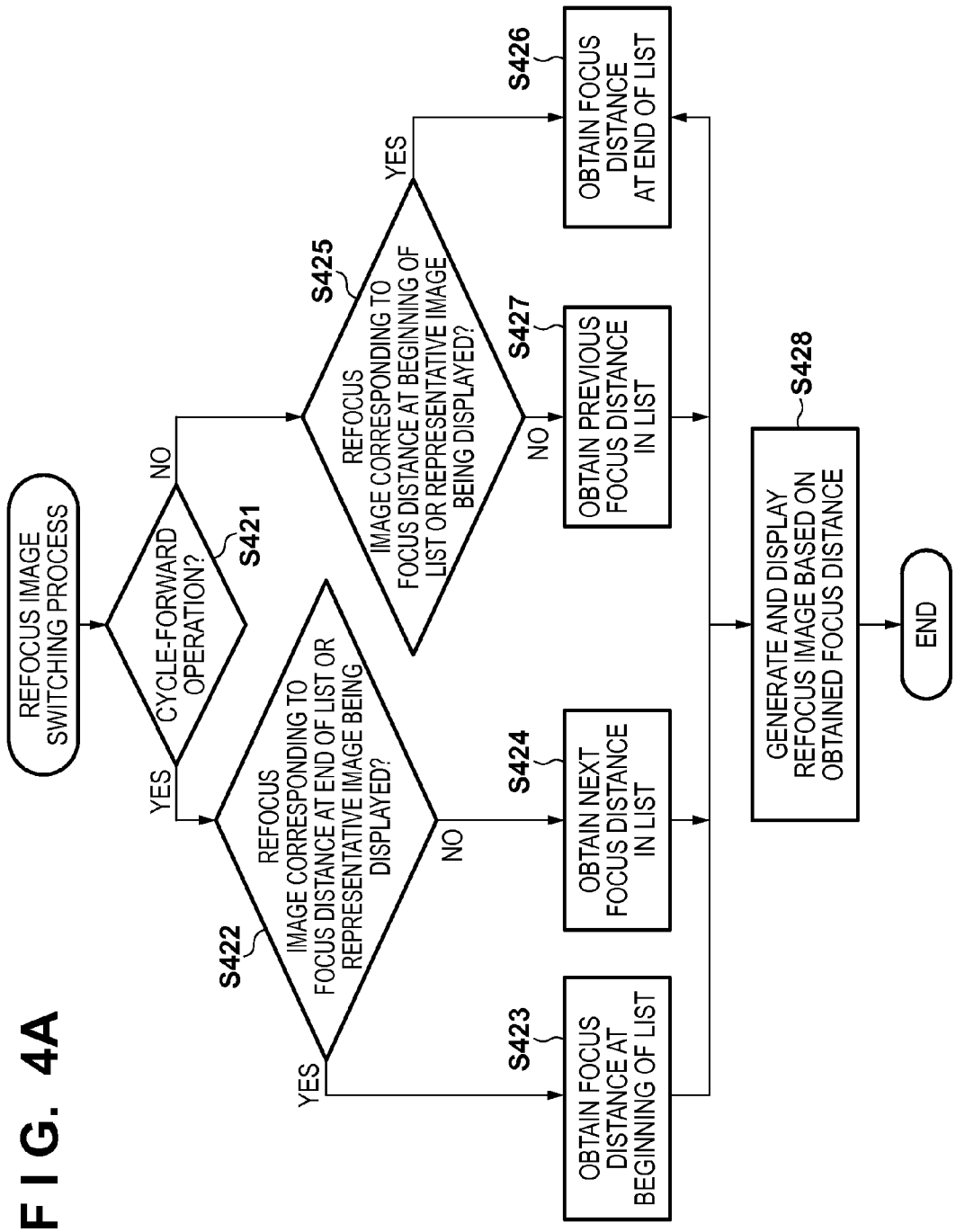
FIGS. 4A and 4B are flowcharts illustrating a refocus image switching process and an image file switching process according to the first embodiment.
Figure 4B:
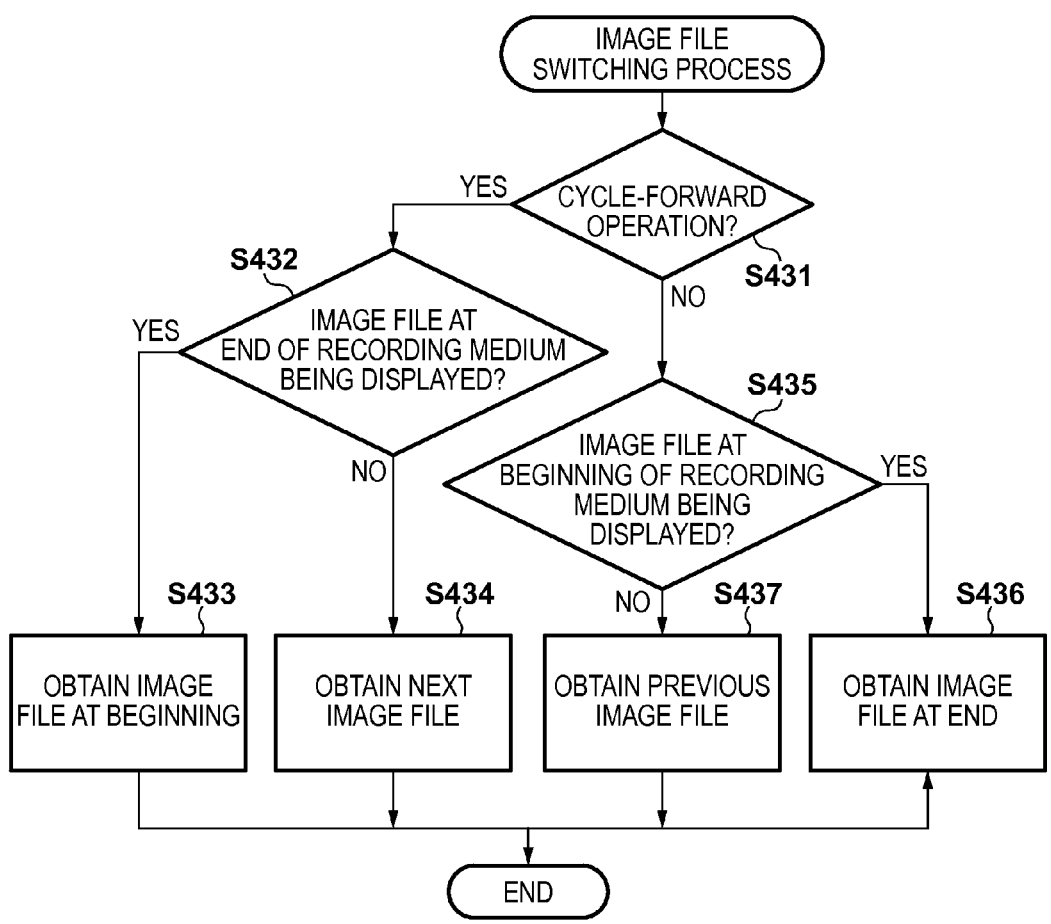
Figure 11:
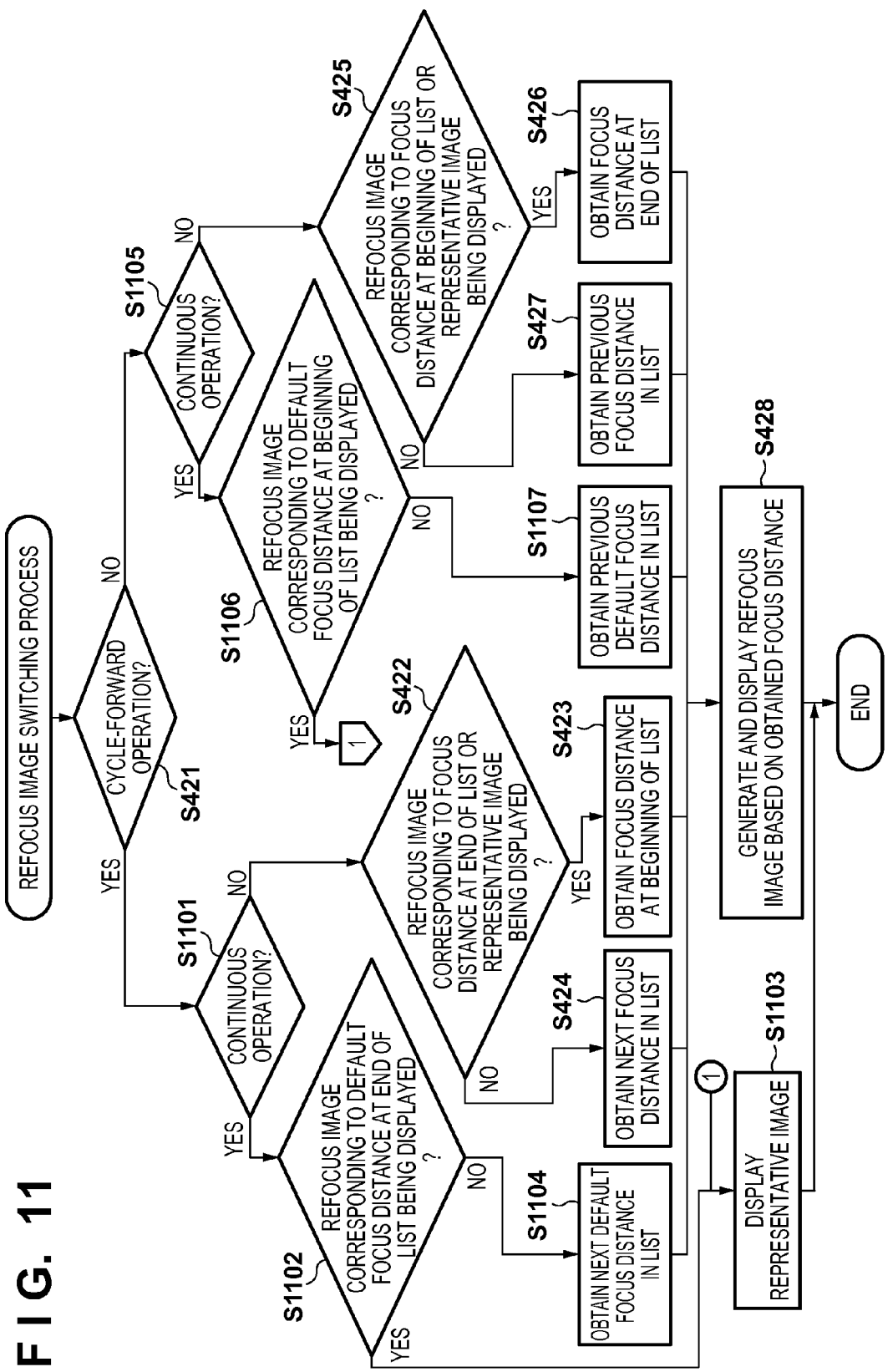
FIG. 11 is a flowchart illustrating operations of a refocus image switching process according to a third embodiment.

In FIG. 11, steps that carry out the same processes as those in FIG. 4A have been given the same reference numerals, and redundant descriptions thereof will be omitted.

In S421, the control unit 201 determines whether the image switching operation 2 detected in S406 is a cycle-forward operation (an operation of the up key); the process moves to S1101 in the case of a cycle-forward operation, and moves to S1105 in the case of a cycle-backward operation (an operation of the down key).

In S1101, the control unit 201 determines whether or not the cycle-forward operation has continued for greater than or equal to a set amount of time. For example, in the case where the up key of the operation button 140 has been held down for greater than or equal to one second, the control unit 201 determines that a continuous cycle-forward operation has been made and moves the process to S1102; meanwhile, the control unit 201 determines that a normal cycle-forward operation has been made in the case where the cycle-forward operation has ended without the set amount of time passing, and moves the process to S422. The processes of S422 and on are the same as in the first embodiment, and thus descriptions thereof will be omitted here.

In S1102, the control unit 201 determines whether or not the refocus image currently displayed in the display unit 110 corresponds to the default focus distance at the end of the focus distance list. In the case where the image being displayed is a refocus image corresponding to the default focus distance at the end of the focus distance list, the control unit 201 moves the process to S1103, and moves the process to S1104 when such is not the case.

In S1103, the control unit 201 displays a representative image of the light field data that generated the refocus image currently being displayed, and ends the refocus image switching process. Note that the representative image displayed here may use an image generated and displayed in S404 and saved, or may be generated again in S1103 and displayed.

In S1104, the control unit 201 refers to the focus distance list, obtains the next default focus distance, and moves the process to S428.

The foregoing are operations regarding the cycle-forward operation.

In the case where a cycle-backward operation has been determined in S421, in S1105, the control unit 201 determines whether or not the cycle-backward operation has continued for greater than or equal to a set amount of time. For example, in the case where the down key of the operation button 140 has been held down for greater than or equal to one second, the control unit 201 determines that a continuous cycle-backward operation has been made and moves the process to S1106; meanwhile, the control unit 201 determines that a normal cycle-backward operation has been made in the case where the cycle-backward operation has ended without the set amount of time passing, and moves the process to S425. The processes of S425 and on are the same as in the first embodiment, and thus descriptions thereof will be omitted here.

In S1106, the control unit 201 determines whether or not the refocus image currently displayed in the display unit 110 corresponds to the default focus distance at the beginning of the focus distance list. In the case where the image being displayed is a refocus image corresponding to the default focus distance at the beginning of the focus distance list, the control unit 201 moves the process to S1103, and moves the process to S1107 when such is not the case.

In S1107, the control unit 201 refers to the focus distance list, obtains the previous default focus distance, and moves the process to S428.

The foregoing are operations regarding the cycle-backward operation.

Figure 12A:
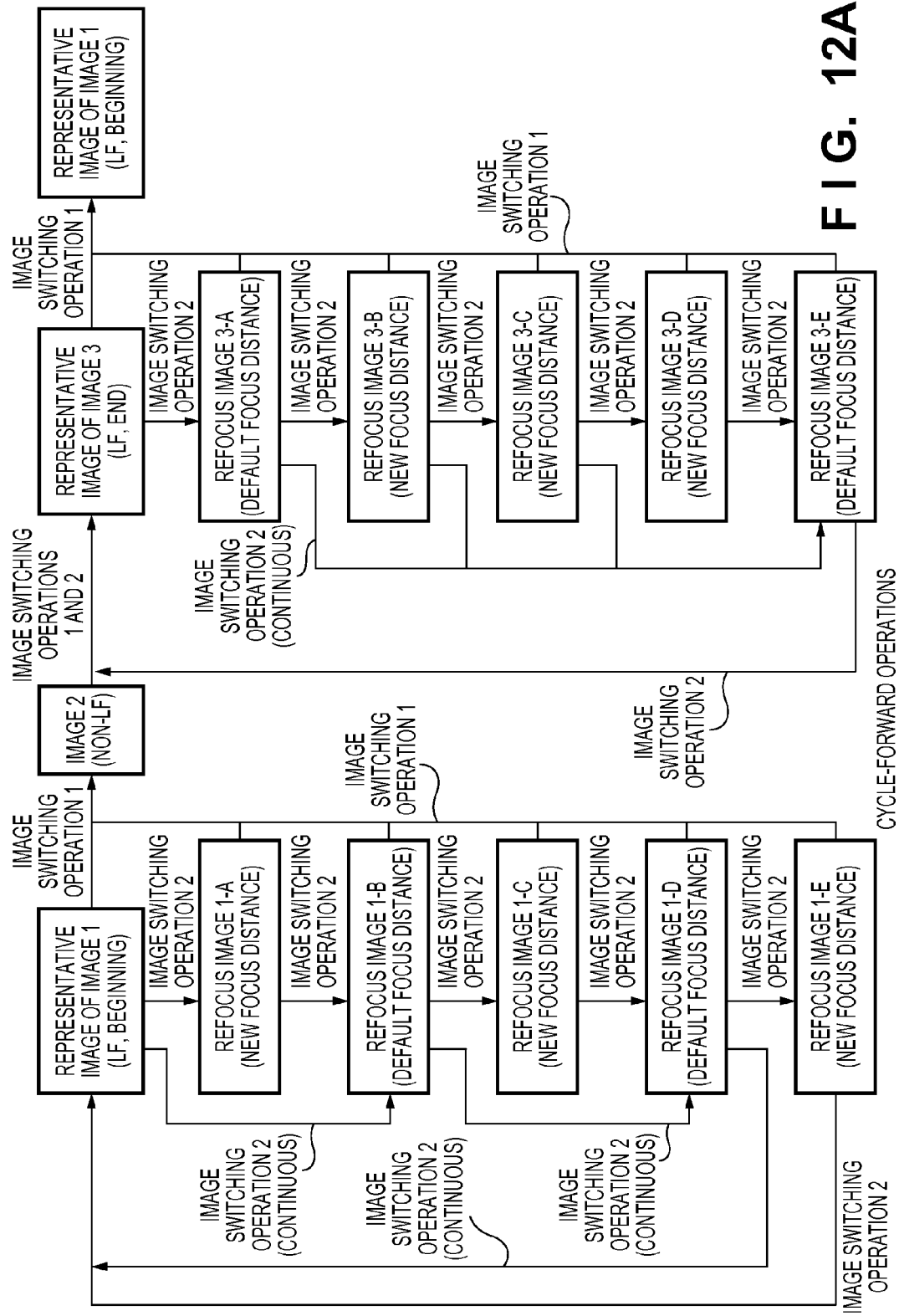
FIGS. 12A and 12B are schematic diagrams illustrating an example of image switching through the playback process operations according to the third embodiment.
Figure 12B:
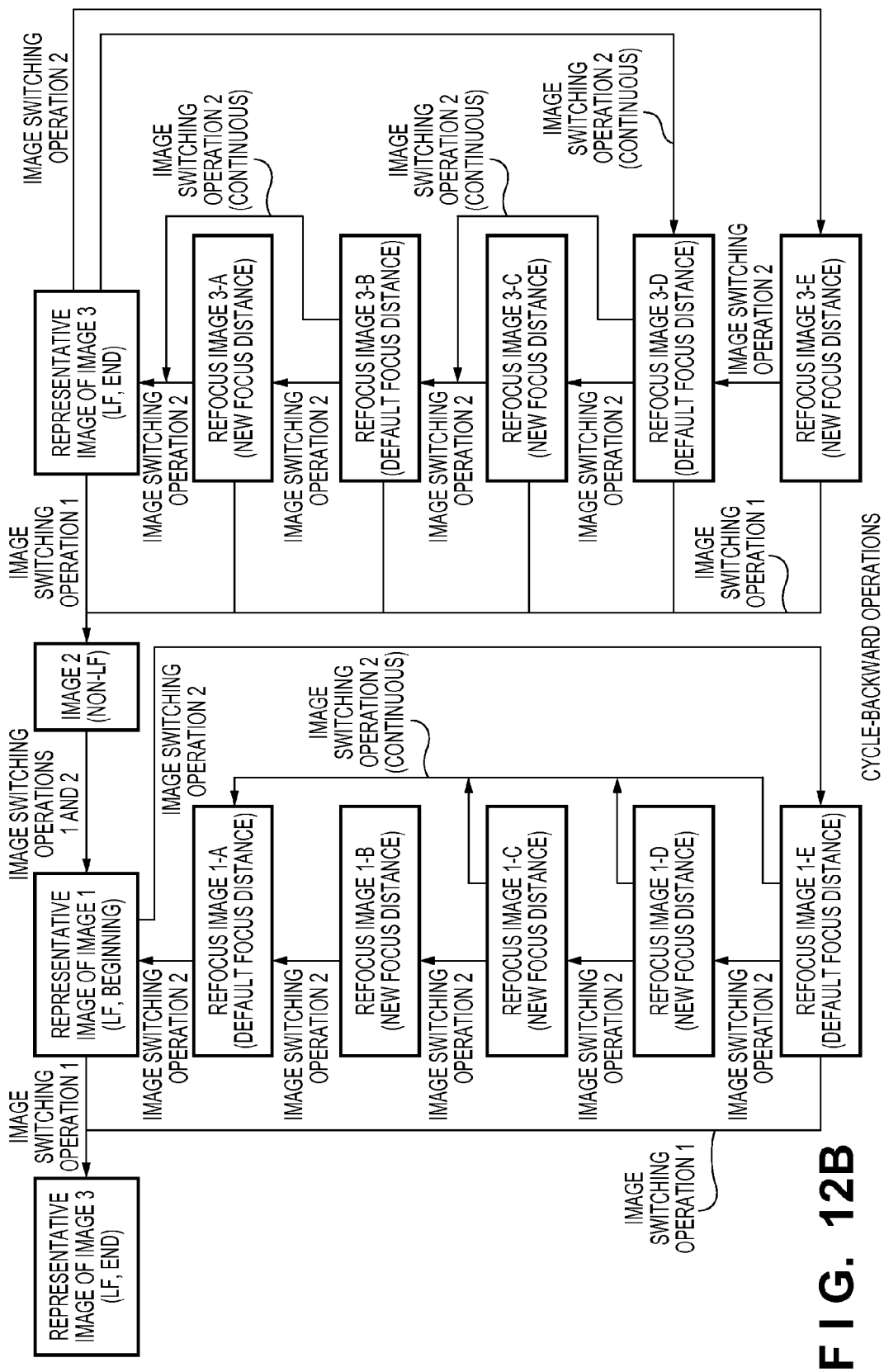

FIGS. 12A and 12B illustrate transitions of displayed images realized through the image switching process according to the present embodiment under conditions in which the same image file as in the first embodiment is recorded into the recording medium 204. FIG. 12A illustrates transitions of displayed images resulting from a cycle-forward image switching operation (the right and up keys of the operation button 140 being manipulated), whereas FIG. 12B illustrates transitions of displayed images resulting from a cycle-backward image switching operation (the left and down keys of the operation button 140 being manipulated). In FIGS. 12A and 12B, "continuous" indicates that the continuous time of each image switching operation 2 is greater than or equal to the set amount of time, whereas not having "continuous" indicates that the continuous time of each image switching operation 2 is less than the set amount of time.

As described thus far, according to the present embodiment, it is possible to select whether or not to restrict the focus distance of the refocus image displayed next, to the default focus distances (that is, whether or not the focus distance may be a new focus distance) in accordance with the amount of time the image switching operation continues, in addition to the effects of the first embodiment. Accordingly, the user can select only the refocus image corresponding to the focus distance set during recording and switch the display through a simple operation. In addition, by carrying out the refocus image switching operation in a continuous manner, the refocus images corresponding to the default focus distances can be confirmed in sequence.

Fourth Embodiment

Next, a fourth embodiment of the present invention will be described. In the present embodiment, a function for additionally setting the new focus distances in the header portion of the image file and the focus distance list through user operations is realized. Like the first embodiment, the image switching operation 2 is assumed to use the up and down keys of the operation button 140, and the image switching operation 1 is assumed to use the left and right keys.

Aside from the playback process and the refocus image switching process, the digital camera 100 according to the present embodiment is the same as that according to the first embodiment, and thus details described in the first embodiment, such as functional configurations, the image file configuration, and so on, will be omitted here.

Figure 13A:
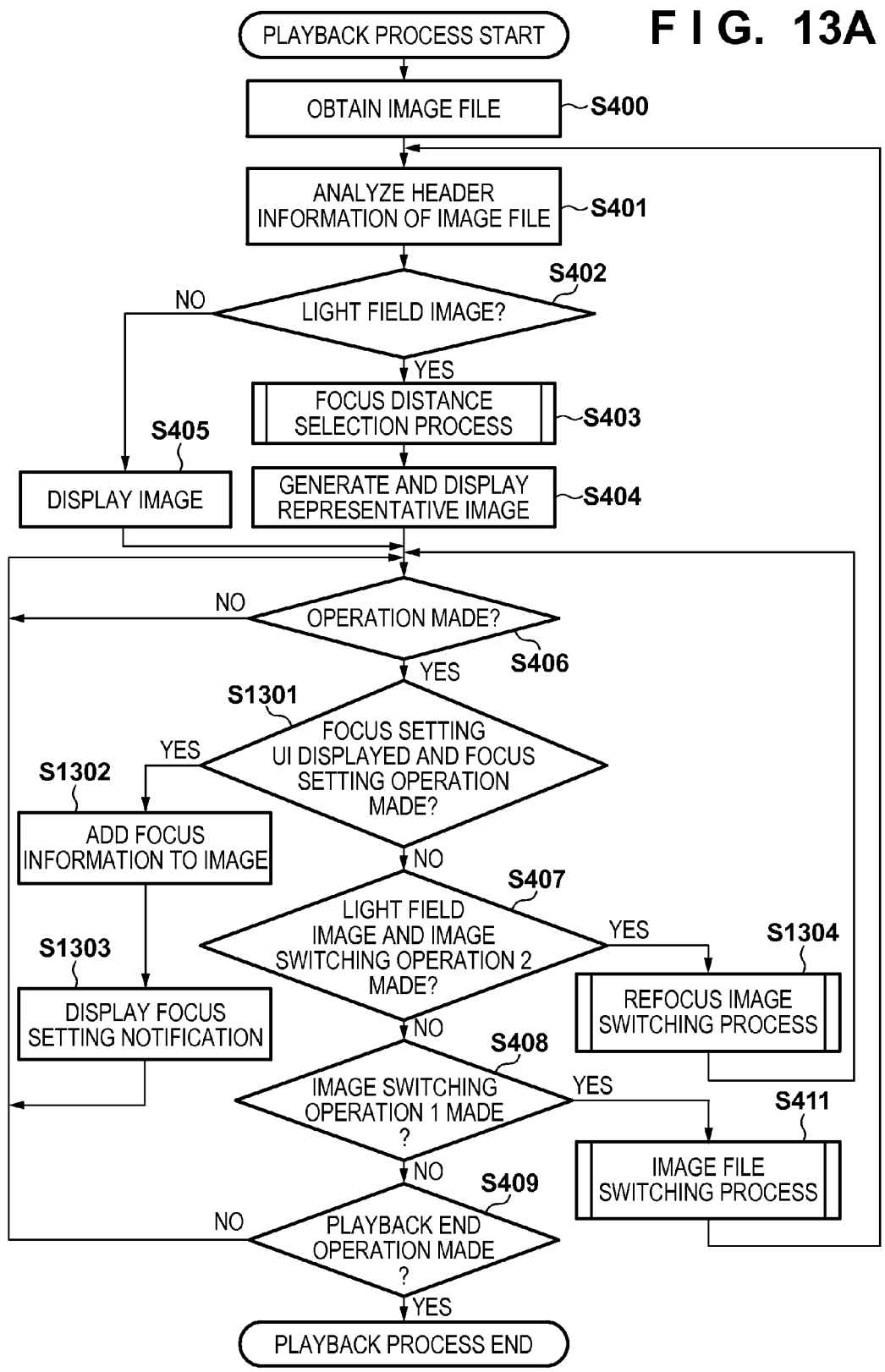
FIG. 13A is a flowchart illustrating operations of a playback process according to a fourth embodiment.

Next, operations performed in the playback process according to the present embodiment will be described using the flowchart in FIG. 13A. In FIG. 13A, steps that carry out the same processes as those in the first embodiment have been given the same reference numerals as in FIGS. 4A and 4B, and redundant descriptions thereof will be omitted.

In S406, upon detecting an operation from the input unit 206, the control unit 201 moves the process to S1307, and it is determined whether or not the operation is a focus setting operation. For example, the control unit 201 determines that the set button 150 of the input unit 206 being manipulated while a focus setting screen, which will be described later, is displayed in the display unit 110 is a focus setting operation. Upon determining that a focus setting operation has been carried out, the control unit 201 moves the process to S1302, and moves the process to S407 in the case of another operation.

In S1302, the control unit 201 adds the focus distance used when generating the refocus image currently displayed in the display unit 110 to the end of the focus information portion 602 of the corresponding image file as new focus information. Furthermore, if that focus distance is included in the focus distance list as a new focus distance, the control unit 201 changes the classification information to "default focus distance", and inserts that focus distance in an appropriate position as a default focus distance if that focus distance is not included in the focus distance list, after which the process is moved to S1303. Here, the "appropriate position" is a position at which the ascending order (or descending order) relationship of the focus distances in the focus distance list will not break down.

Figure 14A:
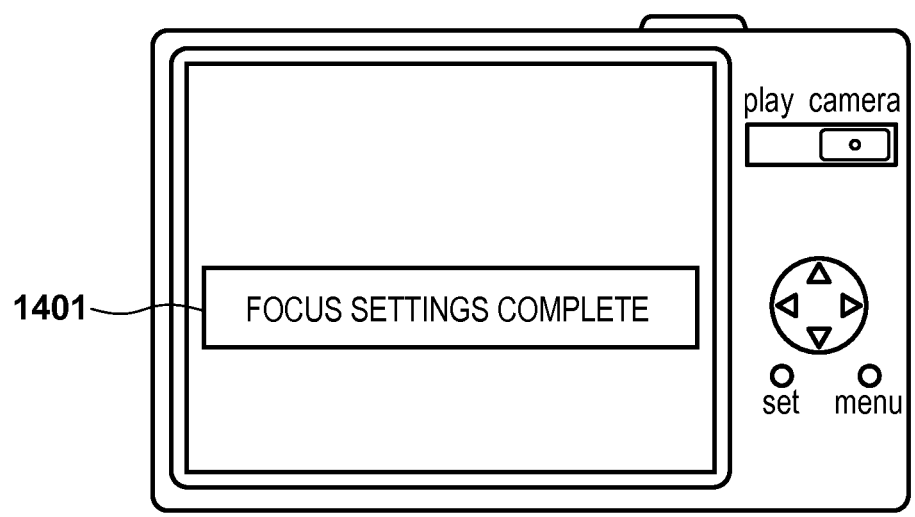
FIGS. 14A and 14B are diagrams illustrating examples of screen displays regarding focus settings according to the fourth embodiment.

In S1303, the control unit 201 displays a focus setting complete notification in the display unit 110, indicating that the focus information has been successfully added, and moves the process to S406. FIG. 14A illustrates an example of the focus setting complete notification display made in S1303. For example, the control unit 201 superimposes a notification 1401 over the image, and automatically clears the notification 1401 after a predetermined amount of time has passed. Alternatively, the control unit 201 may end the display of the notification in accordance with a response operation being made through the input unit 206 in response to the display of the notification 1401.

Figure 13B:
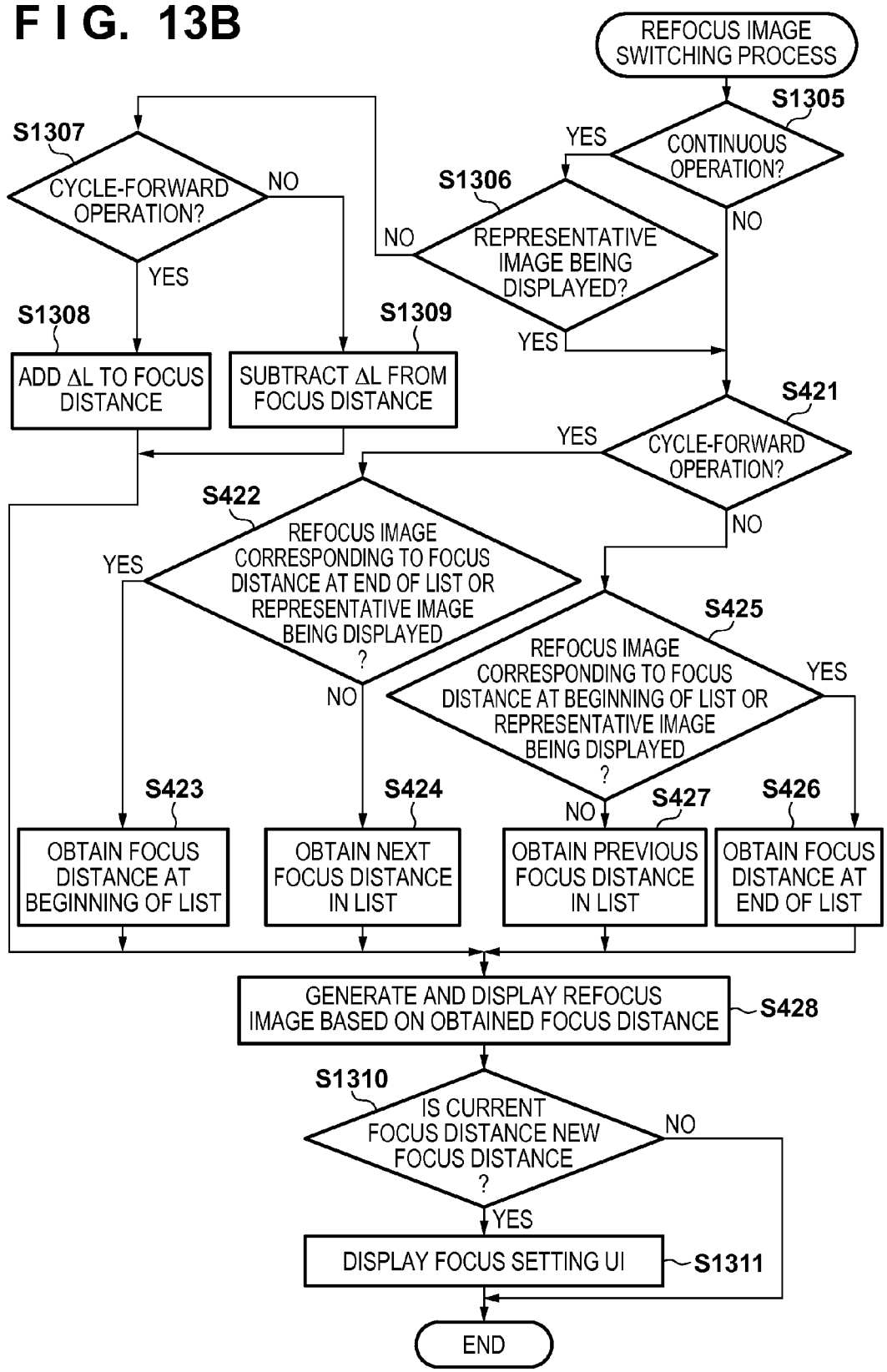
FIG. 13B is a flowchart illustrating operations of a refocus image switching process according to the fourth embodiment.

Next, the refocus image switching process carried out in S1304 in the present embodiment will be described using the flowchart in FIG. 13B. In FIG. 13B, steps that carry out the same operations as those in the first embodiment have been given the same reference numerals, and redundant descriptions thereof will be omitted.

In the refocus image switching process according to the present embodiment, the image switching operation 2 being carried out continuously for greater than or equal to a set amount of time is recognized as a fine adjustment operation of the current focus distance, and a refocus image corresponding to the adjusted focus distance is generated and displayed. Accordingly, by carrying out the image switching operation 2 continuously, the user can view a focused image in which the focus distance changes smoothly until the operation ends or the focus distance at the beginning or end of the focus distance list is reached. In addition, the user can view refocus images corresponding to more focus distances than the maximum focus number $F_{max}$ without changing the maximum focus number $F_{max}$.

Upon the image switching operation 2 being detected during the display of the image generated from the light field data in S407 of FIG. 13A, the control unit 201 moves the process to S1304, and the refocus image switching process illustrated in FIG. 13B is started.

First, in S1305, the control unit 201 determines whether or not the image switching operation 2 has been carried out continuously for greater than or equal to the set amount of time (greater than or equal to one second, for example) since the detection in S406. Here, the image switching operation 2 is an up key or down key operation, and thus the control unit 201 determines the continuous operation in the case where the up key or the down key is held for greater than or equal to one second, and moves the process to S1306. On the other hand, in the case where the image switching operation 2 detected in S406 ends before the set amount of time has passed, the control unit 201 moves the process to S421, and the same processes as in the first embodiment are carried out thereafter up to S428.

In S1306, the control unit 201 determines whether or not the light field image currently being displayed is a representative image; the process moves to S421 in the case where the image is a representative image, and moves the process to S1307 in the case where the image is not a representative image.

In S1307, the control unit 201 determines whether the image switching operation 2 is a cycle-forward operation (an operation of the up key); the process moves to S1308 in the case of a cycle-forward operation, and moves to S1309 in the case of a cycle-backward operation (an operation of the down key).

In S1308, the control unit 201 obtains a focus distance in which a predetermined distance ΔL has been added to the focus distance used to generate the refocus image currently displayed in the display unit 110, and moves the process to S428.

Meanwhile, in S1309, the control unit 201 obtains a focus distance in which the predetermined distance ΔL has been subtracted from the focus distance used to generate the refocus image currently displayed in the display unit 110, and moves the process to S428.

The distance ΔL used to adjust the focus distance in S1308 and S1309 is assumed to be set in advance as an amount at which the focus distance appears to change smoothly when the refocus image is generated and displayed by increasing the focus distance in increments corresponding to the distance ΔL. Note that the control unit 201 does not add the focus distance obtained in S1308 to the focus distance list, at least at this point in time.

The control unit 201 generates, in S428, the refocus image focused at the focus distance obtained in any of S423, S424, S426, S427, S1308, and S1309, displays that refocus image in the display unit 110, and moves the process to S1310.

In S1310, the control unit 201 determines whether or not the focus distance used to generate the refocus image in S428 is a new focus distance; the process moves to S1311 in the case where the focus distance is a new focus distance, and ends in the case where the focus distance is not a new focus distance (is a default focus distance). Here, the control unit 201 determines that a focus distance not included in the focus distance list or included in the focus distance list as a new focus distance is a new focus distance. A focus distance not included in the focus distance list as a default focus distance may be determined to be a new focus distance.

Figure 14B:
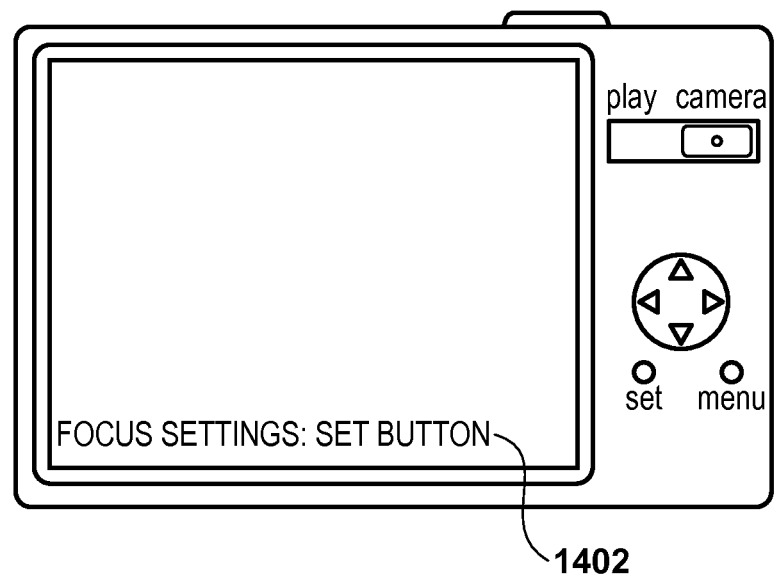

In S1311, the control unit 201 displays a focus setting UI in the display unit 110. The focus setting UI is a UI displayed to enable the focus distance for generating the refocus image currently displayed in the display unit 110 to be saved in the image file and to notify the user of a method for saving the image. Accordingly, the UI may be a GUI that can be directly manipulated by the user in the display unit 110, which is a touch display, or may be a simple message display. Here, the method for saving is assumed to be the set button 150 in the digital camera 100 being manipulated, and a message 1402 such as that illustrated in FIG. 14B is displayed in the display unit 110 as the focus setting UI.

Note that the processes of S406, S1301, S407, and S1304 are repeatedly executed while the image switching operation 2 is being carried out continuously, and thus refocus images whose focus distances change in increments equivalent to ΔL are sequentially generated and displayed in the display unit 110. Then, when the image switching operation 2 ends, the digital camera 100 stands by for an operational input in a state where the refocus image is displayed (S406). At this time, if a refocus image corresponding to a new focus distance is displayed, the focus setting UI is superimposed thereon. Then, when the user manipulates the set button 150 in this state, S1301, S1302, and S1303 are executed, and the focus distance of the refocus image being displayed is added to the image file and the focus distance list as a default focus distance.

Note that in the case where a limit of the refocus range (the default focus distance at the beginning or the end of the focus distance list) is reached while the image switching operation 2 continues, a message indicating such may be displayed in the display unit 110, the updating of the focus distances may be stopped, and the same refocus image may continue to be displayed. Alternatively, the focus distance may be changed from the default focus distance at the end to the default focus distance at the beginning in the case of a cycle-forward operation and may be changed from the default focus distance at the beginning to the default focus distance at the end in the case of a cycle-backward operation, and the fine adjustment of the focus distance may be continued.

According to the present embodiment, in addition to the effects of the first embodiment, by continuing the image switching operation 2, the user can view a focus image in which the focus distance changes smoothly regardless of the maximum focus number $F_{max}$. In addition, the user can set a desired focus distance in an image file as a default focus distance through a simple operation.

Other Embodiments

The foregoing embodiments describe cases in which the image switching operations 1 and 2 are assigned to left and right key and up and down key operations of the operation button 140. However, this is merely an example, and the image switching operations may be assigned to other operations in other input devices. For example, in an electronic device capable of using a touch input device, as in the case where the display unit 110 is a touch panel display, the image switching operations 1 and 2 may be assigned to dragging or flicking operations in different directions, gestures, or the like. In addition, operations using a GUI displayed in the touch panel display may be assigned to the image switching operations 1 and 2.

In addition, the image switching operation 1 and the image switching operation 2 may be identified by a number of touch operations carried out simultaneously. In the case where a touch operation is assigned to an image switching operation, an operation interval and a continuous operation time may be determined based on an operation amount and speed of a dragging operation, a number of operation points, and so on. For example, (1) a flicking operation in the same direction where the operation interval is less than a set amount of time, (2) a dragging operation in a given direction followed by continuous contact at the same position, and so on may be treated as being continuous operations in that direction.

In addition, a tilt and movement direction of an electronic device as detected by an accelerometer provided in the electronic device, a line-of-sight position as detected through line-of-sight examination, and so on may be assigned to image switching operations.

In addition, although the representative image of the light field data has been described as a pan-focus image, another image may be used instead. For example, a refocus image generated using one of the default focus distances obtained through the focus distance selection process or the last refocus image displayed by the user through the image switching operation 2 may be used instead. In addition, the representative image may be generated each time a display instruction is received, or a representative image that has been generated once may be saved in the recording medium 204 and reused. Adding a flag indicating whether or not a representative image has already been generated and a location in the recording medium 204 where the generated representative image is saved to the focus information portion 602 of the header portion 601 in the image file can be expected to reduce the amount of time required for the display. In addition, the representative image generated in S404 may be stored in the RAM 203 and reused in subsequent processes.

In addition, in the refocus image switching process, in the case where a cycle-forward operation has been carried out during the display of the refocus image corresponding to the focus distance at the end of the list, the representative image may be displayed instead of the refocus image corresponding to the focus distance at the beginning of the list. Likewise, in the case where a cycle-backward operation has been carried out during the display of the refocus image corresponding to the focus distance at the beginning of the list, the representative image may be displayed instead of the refocus image corresponding to the focus distance at the end of the list.

In addition, in the focus distance selection process, the new focus distances are arranged at equal intervals between the default focus distances in the case where the number of default focus distances is less than $F_{min}$, but the method for this arrangement is not limited thereto. For example, generally speaking, the closer a subject to be focused on is to the lens surface, the more densely interspersed that subject is with other subjects, and thus more focus distances may be arranged as the focus distances shorten. Alternatively, subject candidates may be detected using a method such as a known object recognition technique, and the distances thereto may then be selected.

In addition, in the second embodiment, the focus distances are reduced in the case where the number of default focus distances exceeds $F_{max}$ by selecting, as a representative value, an element close to an average value among a plurality of focus distances within a group; however, the method of reduction is not limited thereto. For example, the minimum value or maximum value of the plurality of focus distances within the group may be selected, or all elements may be held and a refocus image that is focused at all focus distances within the group may be generated.

With respect to the focus distance list, an image file may be saved in the recording medium 204 when the focus distance selection process is first carried out on that image file, and that image file may then be read out from the recording medium 204 in the case where the focus distance selection process is subsequently carried out on the same image file.

In addition, the minimum focus number $F_{min}$ and the maximum focus number $F_{max}$ may be fixed values, or may be variable by the user, or may be determined dynamically in accordance with the refocus-capable range, the image, or the like.

Furthermore, the aforementioned embodiments describe using light field data as an example of image data from which a plurality of images can be generated. However, the present invention can be applied to other types of data aside from light field data. For example, the present invention can also be applied in a process of generating an image where a selected location is in focus by using pan-focus image data and a depth map and carrying out an adaptive process adding a bokeh effect.

Although the present invention has been described based on exemplary embodiments thereof, the present invention is not intended to be limited to these specific embodiments, and many variations, derivations, and so on that fall within the scope defined by the appended claims are also included in the present invention. Furthermore, the foregoing embodiments may be partially combined as appropriate.

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-219714, filed on Oct. 28, 2014, which is hereby incorporated by reference herein in its entirety.

What is claimed is:
1. An image processing apparatus comprising:
an input unit having one or more input devices through which a first image switching operation and a second image switching operation can be made;
one or more processors that execute computer executable instructions to function as:
a control unit configured to switch a displayed image in accordance with an image switching operation made through the input unit,
wherein the control unit:
switches an image being displayed to an image generated from an image file being different from an image file used to generate the image being displayed in a case where the first image switching operation has been made through the input unit; and
switches the image currently being displayed to a different image generated from the image file used to generate the image being displayed in a case where the second image switching operation has been made through the input unit, and
wherein;
the different image is an image representing the same scene as the image being displayed but having a different area being in focus; and the different image is an image obtained by carrying out an adaptive process adding a bokeh effect on a pan-focus image.

2. The image processing apparatus according to claim 1, wherein the first image switching operation is an operation that indicates a first direction and the second image switching operation is an operation that indicates a second direction being orthogonal to the first direction.

3. The image processing apparatus according to claim 1, wherein the first image switching operation is an operation that indicates a horizontal direction and the second image switching operation is an operation that indicates a vertical direction.

4. The image processing apparatus according to claim 1, wherein the first image switching operation is an operation that indicates a right or left direction and the second image switching operation is an operation that indicates an up or down direction.

5. The image processing apparatus according to claim 1, wherein the first image switching operation and the second image switching operation are operations of a directional key or a touch input device included in the input unit.

6. The image processing apparatus according to claim 1, wherein the control unit switches the image being displayed in response to the second image switching operation in a case where the image being displayed is generated from an image file from which a plurality of images can be generated.

7. An image processing apparatus comprising:
an input unit having one or more input devices through which a first image switching operation and a second image switching operation can be made;
one or more processors that execute computer executable instructions to function as:
a control unit configured to switch a displayed image in accordance with an image switching operation made through the input unit,
wherein the control unit:
switches an image being displayed to an image generated from an image file being different from an image file used to generate the image being displayed in a case where the first image switching operation has been made through the input unit; and
switches the image currently being displayed to a different image generated from the image file used to generate the image being displayed in a case where the second image switching operation has been made through the input unit, and
wherein the different image is an image representing the same scene as the image being displayed but having a different area being in focus, and
wherein the control unit treats the first image switching operation as having been made in the case where a plurality of the second image switching operations have been made through the input unit within a predetermined amount of time.

8. The image processing apparatus according to claim 7, wherein the different image is a refocus image generated from a light field data image file.

9. An image processing apparatus comprising:
an input unit having one or more input devices through which a first image switching operation and a second image switching operation can be made;
one or more processors that execute computer executable instructions to function as:
a control unit configured to switch a displayed image in accordance with an image switching operation made through the input unit,
wherein the control unit:
switches an image being displayed to an image generated from an image file being different from an image file used to generate the image being displayed in a case where the first image switching operation has been made through the input unit; and
switches the image currently being displayed to a different image generated from the image file used to generate the image being displayed in a case where the second image switching operation has been made through the input unit, and
wherein:
the different image is an image representing the same scene as the image being displayed but having a different area being in focus;
the control unit switches the image being displayed in response to the second image switching operation in a case where the image being displayed is generated from an image file from which a plurality of images can be generated; and
the control unit generates the different image based on information indicating a focus distance set in the image file used to generate the image being displayed in the case where the second image switching operation has been made through the input unit.

10. The image processing apparatus according to claim 9, wherein the control unit adds information indicating a focus distance based on the information indicating the set focus distance in the case where a number of pieces of the information indicating the set focus distance is lower than a predetermined number.

11. The image processing apparatus according to claim 10, wherein the control unit generates the different image using the information indicating the set focus distance and without using the added information indicating the focus distance in a case where the second image switching operation has been made continuously for greater than or equal to a predetermined amount of time through the input unit.

12. The image processing apparatus according to claim 10, wherein the control unit generates the different image using the added information indicating the focus distance or the information indicating the set focus distance in a case where the second image switching operation has not been made continuously for greater than or equal to a predetermined amount of time through the input unit.

13. The image processing apparatus according to claim 9, wherein the control unit sequentially generates the different image while changing the focus distance used to generate the image being displayed one predetermined amount at a time in a case where the second image switching operation has been made continuously for greater than or equal to a predetermined amount of time through the input unit.

14. The image processing apparatus according to claim 9, wherein a setting operation can also be made through the input unit; and
in the case where an image being displayed when the setting operation is made through the input unit is an image based on an image file from which a plurality of images can be generated and the image being displayed has not been generated based on the information indicating the set focus distance, the control unit adds information indicating a focus distance used to generate the image being displayed to the image file.

15. The image processing apparatus according to claim 9, wherein in the case where a number of pieces of the information indicating the set focus distance is higher than a predetermined number, the control unit does not use some of the information indicating the set focus distance.

16. A control method of an image processing apparatus having an input unit, wherein the input unit having one or more input devices through which a first image switching operation and a second image switching operation can be made, the method comprising:
 switching an image being displayed to an image generated from an image file being different from an image file used to generate the image being displayed in a case where the first image switching operation has been made through the input unit; and
 switching the image currently being displayed to a different image generated from the image file used to generate the image being displayed in a case where the second image switching operation has been made through the input unit,
wherein:
the different image is an image representing the same scene as the image being displayed but having a different area being in focus; and
the different image is an image obtained by carrying out an adaptive process adding a bokeh effect on a pan-focus image.

17. A non-transitory computer-readable storage medium in which is stored a program for causing a computer to function as at least a control unit of an image processing apparatus comprising:
 an input unit having one or more input devices through which a first image switching operation and a second image switching operation can be made; and
 a control unit configured to switch a displayed image in accordance with an image switching operation made through the input unit,
wherein the control unit:
switches an image being displayed to an image generated from an image file being different from an image file used to generate the image being displayed in a case where the first image switching operation has been made through the input unit; and
switches the image currently being displayed to a different image generated from the image file used to generate the image being displayed in a case where the second image switching operation has been made through the input unit, and
wherein:
the different image is an image representing the same scene as the image being displayed but having a different area being in focus; and
the different image is an image obtained by carrying out an adaptive process adding a bokeh effect on a pan-focus image.

* * * * *